(12) United States Patent
Sheppard et al.

(10) Patent No.: US 12,711,358 B1
(45) Date of Patent: Aug. 18, 2026

(54) SYSTEM AND METHOD FOR ADAPTIVE MULTI-TIER PROCESSING OF GENERATIVE ARTIFICIAL INTELLIGENCE INPUT COMMUNICATIONS

(71) Applicant: ICA AI, Inc., Boca Raton, FL (US)

(72) Inventors: Raymond J. Sheppard, Spring Hill, FL (US); Akila Muthukrishnan, Bangalore (IN)

(73) Assignee: ICA AI, Inc., Boca Raton, FL (US)

( * ) Notice: Subject to any disclaimer, the term of this patent is extended or adjusted under 35 U.S.C. 154(b) by 0 days.

(21) Appl. No.: 19/574,071

(22) Filed: Mar. 20, 2026

(51) Int. Cl.
*G06N 3/0475* (2023.01)

(52) U.S. Cl.
CPC .................................. *G06N 3/0475* (2023.01)

(58) Field of Classification Search
None
See application file for complete search history.

(56) References Cited

U.S. PATENT DOCUMENTS

2020/0349199 A1* 11/2020 Jayaraman .............. G06F 40/49
2025/0013893 A1* 1/2025 Raymond .......... G06Q 50/2057
2025/0272279 A1* 8/2025 Kshirsagar .......... G06F 16/2428
2025/0272509 A1* 8/2025 Kshirsagar .............. G06F 40/40
2026/0037558 A1* 2/2026 Savage ............... G06F 16/2237

* cited by examiner

*Primary Examiner* — Daniel T Pellett
(74) *Attorney, Agent, or Firm* — Marin Patents, LLC; Gustavo Marin

(57) ABSTRACT

A system and method for adaptive semantic routing of artificial intelligence (AI) communications is disclosed. A semantic router receives AI incoming communications and generates dense embedding vectors. A similarity score is computed between input embeddings and cached semantic objects stored in a semantic representation repository. A direct cache retrieval is performed when similarity exceeds a first confidence threshold, full generative AI processing when similarity is below a second threshold, or a hybrid template-based assembly combining cached static segments with dynamically generated content when similarity falls between thresholds. For voice applications, specialized components including audio to intent encoder, prosodic normalizer for natural speech assembly, dynamic slot synthesizer for variable content, and codec transformer for telephony compatibility enable audio waveform caching with sub-200 ms latency are used. A reward-based learning optimizer continuously adjusts routing thresholds based on quality feedback collected across cache hit rates, response quality, slot accuracy, latency, and prosodic naturalness.

15 Claims, 13 Drawing Sheets

106
Interfaces
110
100
Remote Storage
Remote Storage
120
Processor(s)
103
Local Storage
101
102

SYSTEM AND METHOD FOR ADAPTIVE MULTI-TIER PROCESSING OF GENERATIVE ARTIFICIAL INTELLIGENCE INPUT COMMUNICATIONS

CROSS-REFERENCE TO RELATED APPLICATIONS

None.

BACKGROUND OF THE INVENTION

Field of the Art

The disclosure relates to the field of optimizing resource utilization in generative artificial intelligence services and more particularly to the field of semantic understanding and routing of multi-modal input signals including text, audio, image, and video communications.

Discussion of the State of the Art

The emergence of large language models and generative artificial intelligence has fundamentally transformed how computing systems process and respond to human communications. Organizations across industries have recognized the transformative potential of deploying these technologies for customer service automation, voice-based assistants, content generation, and interactive applications. These systems demonstrate remarkable capabilities in understanding natural language, generating contextually appropriate responses, and processing multi-modal inputs including text, voice, images, and video.

However, there are constraints that limit widespread deployment. Modern generative AI systems universally operate through tokenization. Tokenization is a process in which input signals, whether text, audio, or other modalities, are decomposed into discrete tokens that serve as the atomic units of processing. Each token must traverse the neural network's computational graph, requiring substantial GPU memory allocation, matrix multiplication operations, and inference cycles. Every interaction, regardless of whether the underlying semantic content has been previously encountered, requires the same full computational pipeline to execute.

The computational burden of tokenization creates a linear scaling problem that becomes increasingly acute as deployment volumes increase. A voice-based AI system processing conversational interactions may generate thousands of tokens per minute of speech, with each token requiring dedicated computational resources. When identical or semantically equivalent queries are processed repeatedly (commonly seen in transactional and service-oriented applications), the system expends the same computational resources.

Beyond computational resource consumption, the tokenization architecture introduces latency constraints that impair real-time interactive applications. Voice-based AI systems require sub-200 millisecond response times to maintain natural conversational flow, yet the sequential processing of tokens through deep neural networks typically requires 500-2000 milliseconds for complete inference cycles. This latency gap creates perceptible delays that degrade user experience and limit the applicability of generative AI to time-sensitive interaction scenarios. The latency is fundamentally tied to the token count and model depth, meaning that optimization efforts focused on hardware acceleration alone cannot fully address the architectural constraint.

Current generative AI deployment architectures typically rely on external inference services accessed through network APIs. This dependency introduces additional latency from network round-trips, creates single points of failure when external services experience outages, and results in unpredictable response times during periods of high service demand.

Traditional prompt caching systems (e.g., OpenAI automatic prompt caching, Anthropic prompt caching) operate on exact string matching, requiring identical input prefixes to achieve cache hits. Such systems achieve only 10-20% cache hit rates in production conversational applications because natural language variation causes cache misses even for semantically identical requests. Similarly, intent classification systems map inputs to predefined categories (e.g., "check_balance", "transfer_funds") but lack the granularity to capture semantic nuance within categories and do not support hybrid template-based assembly for intermediate similarity scores. Retrieval-Augmented Generation (RAG) systems retrieve relevant context documents to augment LLM generation but do not eliminate generation itself. Every query still requires full tokenization and inference cycles.

Further, voice-based AI applications face additional challenges as audio signals must first undergo speech recognition to produce text transcripts, introducing transcription latency and potential recognition errors that propagate through downstream processing. Furthermore, generating audio responses requires text-to-speech synthesis, one of the most computationally intensive operations in the voice AI pipeline. Existing systems perform this synthesis operation for every response, even when identical responses have been previously generated, wasting computational resources on redundant audio generation.

When voice AI systems attempt to reduce computational load through audio segment concatenation, the resulting output often exhibits unnatural prosodic discontinuities at segment boundaries. The human auditory system is highly sensitive to variations in pitch, rhythm, and energy patterns that occur when separately recorded or synthesized audio segments are joined. These artifacts create a "robotic" quality that undermines user acceptance of voice AI systems, particularly in applications requiring natural conversational interaction.

Furthermore, the integration of modern generative AI capabilities with existing telephony infrastructure presents substantial technical challenges. Traditional telephone networks operate with specific codec requirements, signaling protocols, and latency constraints that differ fundamentally from web-based AI service architectures. Voice AI systems must bridge between Session Initiation Protocol (SIP) signaling, Public Switched Telephone Network (PSTN) interconnections, and various Voice over IP implementations while maintaining the sub-200 millisecond latency requirements for natural conversation. Existing bridging solutions often introduce unacceptable latency or fail to properly transcode between codec formats required by different network segments.

As generative AI capabilities expand across modalities (e.g., text, voice, image, and video), existing optimization approaches remain fragmented by modality type. Text-based caching systems cannot be applied to voice interactions; voice optimization techniques do not transfer to image generation; and each modality requires separate optimization infrastructure with distinct engineering investment. This fragmentation multiplies the complexity and cost of deploying optimized AI systems across multi-modal applications, creating maintenance burden and preventing cross-modal knowledge transfer.

Hence, there is a need for systems that can intelligently route AI processing requests, exploit partial content reusability, seamlessly integrate with existing telephony infrastructure for voice applications, and generalize across input modalities to provide unified optimization capabilities for text, voice, image, and video AI applications.

SUMMARY OF THE INVENTION

Accordingly, the inventor has conceived and reduced to practice, in a preferred embodiment of the invention, a system and method for optimizing artificial intelligence communications through adaptive multi-tier semantic routing that reduces computational costs while maintaining response quality. The system implements a communication management server comprising one or more processors, a memory, and programming instructions that receive incoming communications destined for AI processing across multiple modalities including text, audio, image, and video. A semantic encoder generates dense embedding vectors within a multi-dimensional semantic embedding space that capture semantic meaning independent of surface-level linguistic or signal variations. An embedding similarity analyzer determines similarity scores between incoming communication embeddings and cached semantic objects stored in a semantic representation repository. A confidence threshold controller implements three-tier routing based on similarity thresholds: direct cache retrieval when similarity exceeds a first threshold, transmission to external generative AI services when similarity falls below a second threshold, and hybrid processing combining cached static segments with dynamically generated content when similarity falls between thresholds. A reward-based learning optimizer continuously adjusts routing thresholds based on response quality feedback, cache hit rates and cost-performance tradeoffs, enabling the system to achieve progressively higher cache hit rates while maintaining quality standards.

According to a preferred embodiment of the invention, the semantic routing process employs modality-specific encoders that project inputs into a shared semantic embedding space enabling unified optimization across text, voice, image, and video AI applications. Text encoder processes text inputs using transformer-based language models. Speech to vector encoder converts audio inputs directly into semantic vectors. Image encoder processes visual inputs. Video encoder handles temporal visual content. All encoders project inputs into a shared semantic embedding space enabling similarity computation regardless of input modality. The multi-modal encoder architecture eliminates fragmented optimization approaches that previously required separate infrastructure for each modality, instead providing unified semantic routing capabilities that generalize cost optimization benefits across all AI application types while maintaining modality-specific encoding quality.

According to a preferred embodiment of the invention, voice-specific optimizations implement specialized processing capabilities for audio input modalities through components including audio to intent encoder that converts incoming audio streams directly into semantic intent representations without requiring intermediate speech-to-text conversion, eliminating transcription latency and preventing transcription errors from propagating to downstream processing. Audio cache stores pre-computed audio waveforms corresponding to validated responses in multiple codec formats including G.711 for Public Switched Telephone Network (PSTN) compatibility, Opus for Voice over Internet Protocol (VOIP) applications, and Web Real-Time Communication (WebRTC) formats for browser-based communications. Prosodic normalizer processes cached audio segments to ensure natural speech flow when assembling hybrid responses from multiple audio sources, adjusting pitch contours, timing, and energy levels to create seamless transitions between cached static segments and dynamically generated audio elements. Dynamic slot synthesizer generates audio for variable content including names, dates, times, account numbers, and other personalized information that cannot be pre-cached. Codec transformer handles audio format conversion to match requirements of different delivery channels spanning PSTN telephony, Session Initiation Protocol (SIP) signaling, mobile VoIP, web browsers, and native applications.

According to a preferred embodiment of the invention, the continuous optimization capability implements reinforcement learning techniques to progressively improve routing decisions based on accumulated quality feedback and cost data. Response quality evaluator collects multiple quality metrics including cache hit rates measuring percentage of requests served from cache, response quality feedback derived from user interactions and explicit ratings, slot accuracy for hybrid responses measuring correct dynamic element insertion, latency measuring response time, and prosodic naturalness for audio responses measuring speech quality characteristics. Quality scores are computed using weighted combinations of collected metrics with weighting configured based on domain requirements.

Threshold adjustment implements gradient-based or reinforcement learning update rules where quality scores exceeding target thresholds trigger threshold lowering to increase cache utilization and cost savings, while quality scores falling below target thresholds trigger threshold raising to reduce false positives and improve response accuracy. The system achieves progressively higher cache hit rates over deployment trajectory with initial deployment achieving 40-60% cache hit rates, growth phase reaching 60-80% cache hit rates as the system accumulates feedback and optimizes thresholds, and mature phase achieving 80-95% cache hit rates representing cost reductions from approximately $0.30 per minute for full generative voice AI processing to approximately $0.02-$0.03 per minute blended cost at operational maturity.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting the scope of the invention or the claims herein in any way.

DETAILED DESCRIPTION

Figure 1:
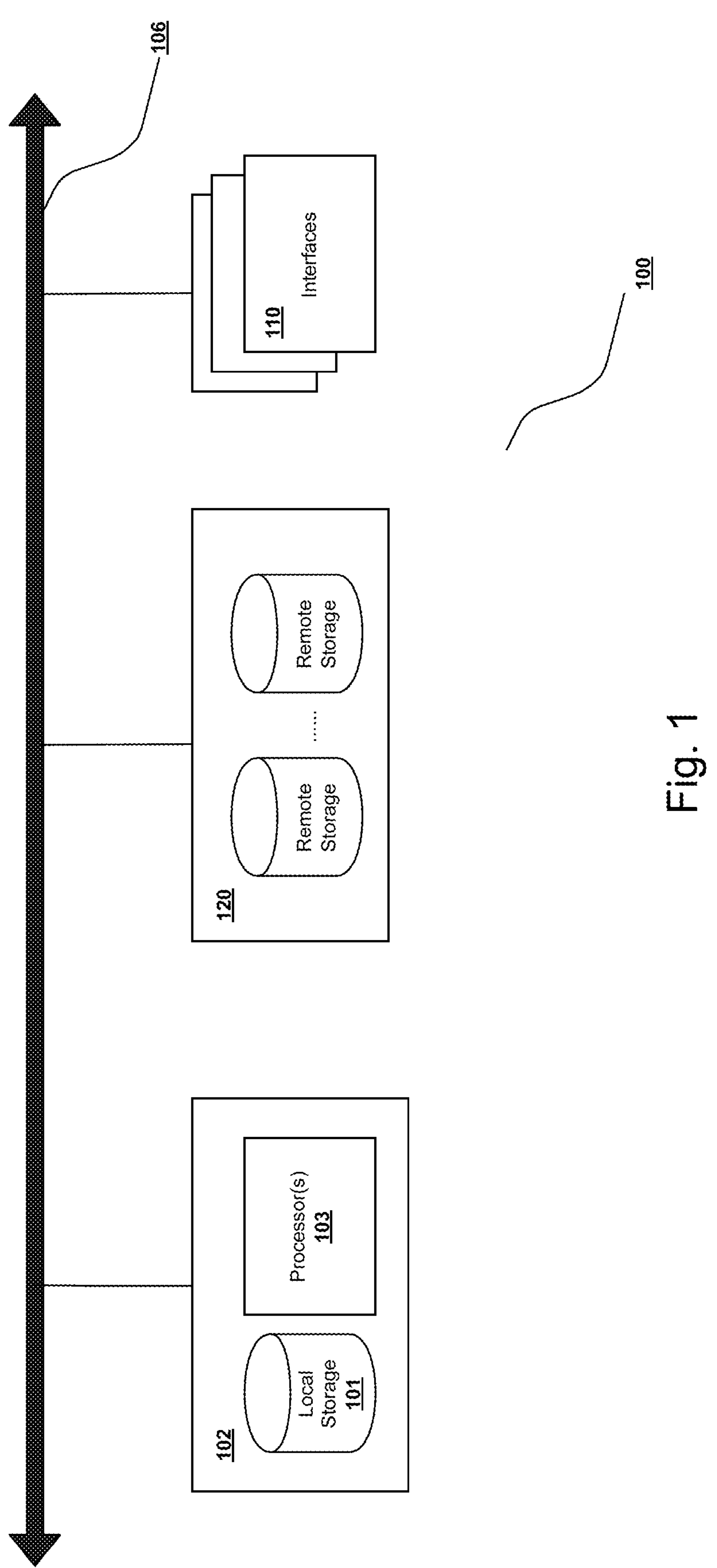
FIG. 1 is a block diagram illustrating an exemplary hardware architecture of a computing device used in an embodiment of the invention.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to fully illustrate one or more aspects of the inventions. Similarly, although process steps, method steps, algorithms or the like may be described in sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of the described processes may be performed in any practical order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the inventions, and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of more than one device or article.

The functionality or features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

One or more different inventions may be described in the present application. Further, for one or more of the inventions described herein, numerous alternative embodiments may be described; it should be appreciated that these are presented for illustrative purposes only and are not limiting the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. On the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of the processes described may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the inventions, and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network, a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control the execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
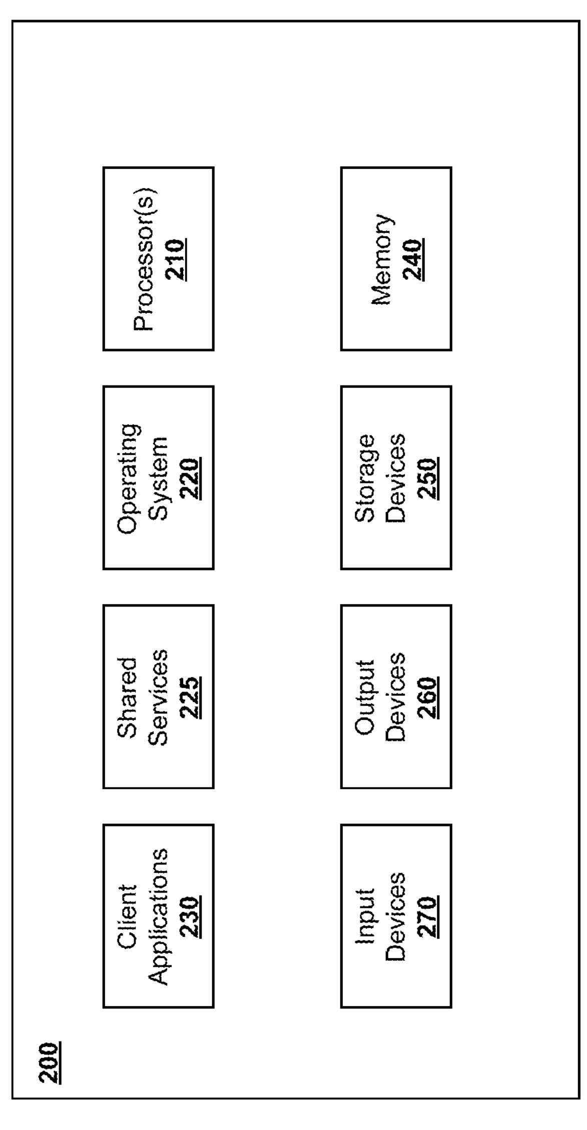
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example, to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
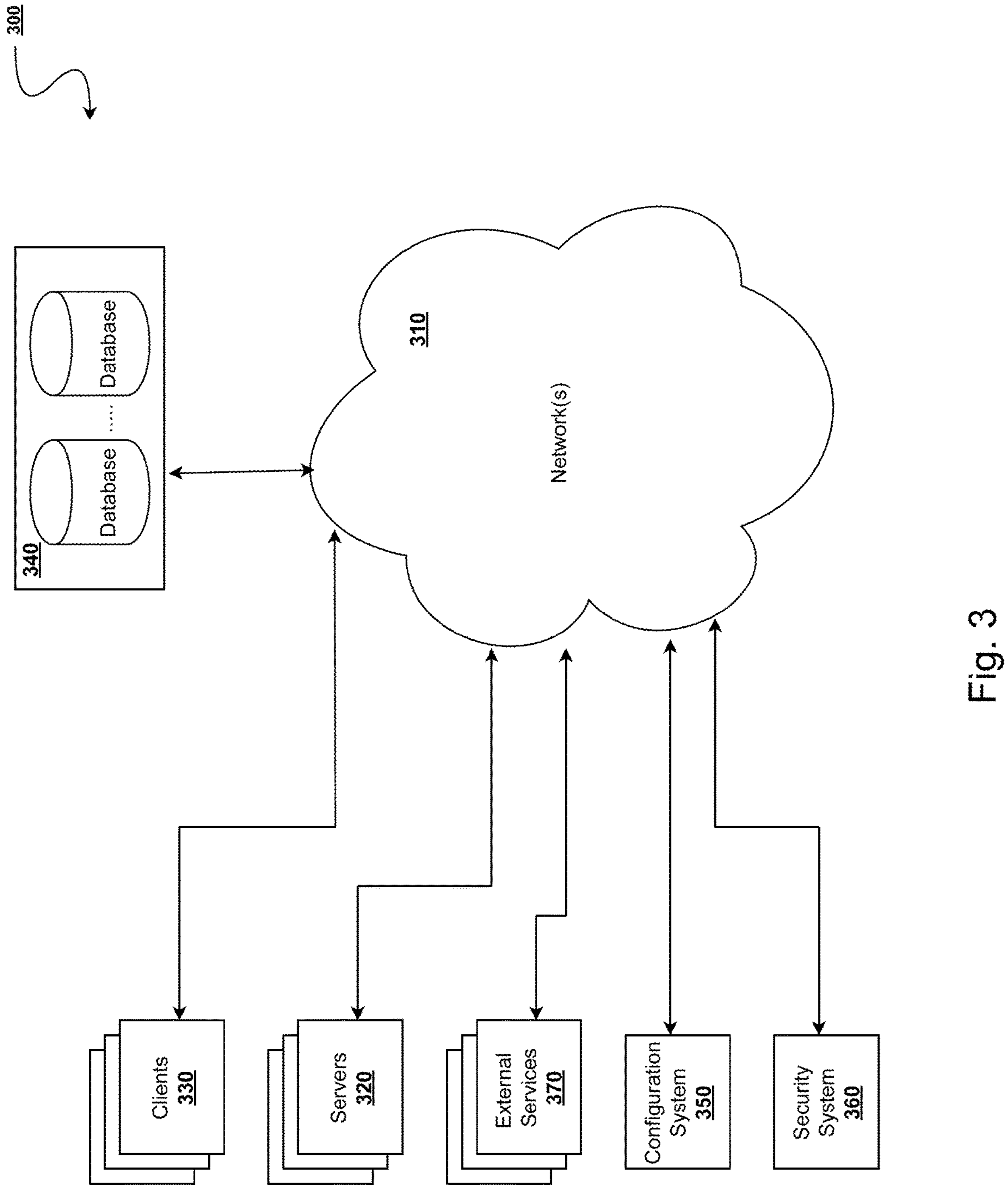
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular incoming communication. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments, one or more databases 340 may comprise a relational database system using a structured query language (SQL), while others may comprise an alternative data storage technology such as those referred to in the art as "NoSQL" (for example, Hadoop Cassandra, Google Big Table, Mongo, and so forth). In some embodiments, variant database architectures such as column-oriented databases, in-memory databases, clustered databases, distributed databases, or even flat file data repositories may be used according to the invention. In addition, Graph-oriented databases, also known as graph databases, are designed to manage and store data structured as graphs, where entities (nodes) are interconnected with relationships (edges), examples include (Amazon Neptune, Microsoft Azure Cosmos DBs, TigerGraph, GraphDB and so forth). These databases are particularly effective for applications involving complex relational queries and traversals, such as social networks, recommendation systems, and network topology analysis.

In addition, vector databases also referred to as vector search databases or similarity search databases, are engineered to index, manage, and retrieve high-dimensional vectors typically generated by machine learning models. These databases are adept at handling operations such as nearest neighbor search in vector space, which is critical for tasks involving image recognition, natural language processing, and recommendation engines, where items are represented as vectors in a multi-dimensional space. Notable examples include Pinecone, Milvus, Weaviate, and Elasticsearch with vector plugins. Vector databases excel in scenarios that require matching patterns or finding similar items based on vector proximity, making them indispensable for modern AI-driven applications such as semantic search, personalization features, and fraud detection systems.

It will be appreciated by one having ordinary skill in the art that any combination of known or future database technologies may be used as appropriate unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each is generally associated with any IT or web systems. It should be understood by one having ordinary skill in the art that any configuration or security subsystems known in the art now or in the future may be used in conjunction with embodiments of the invention without limitation unless a specific security 360 or configuration system 350 or approach is specifically required by the description of any specific embodiment.

Figure 4A:
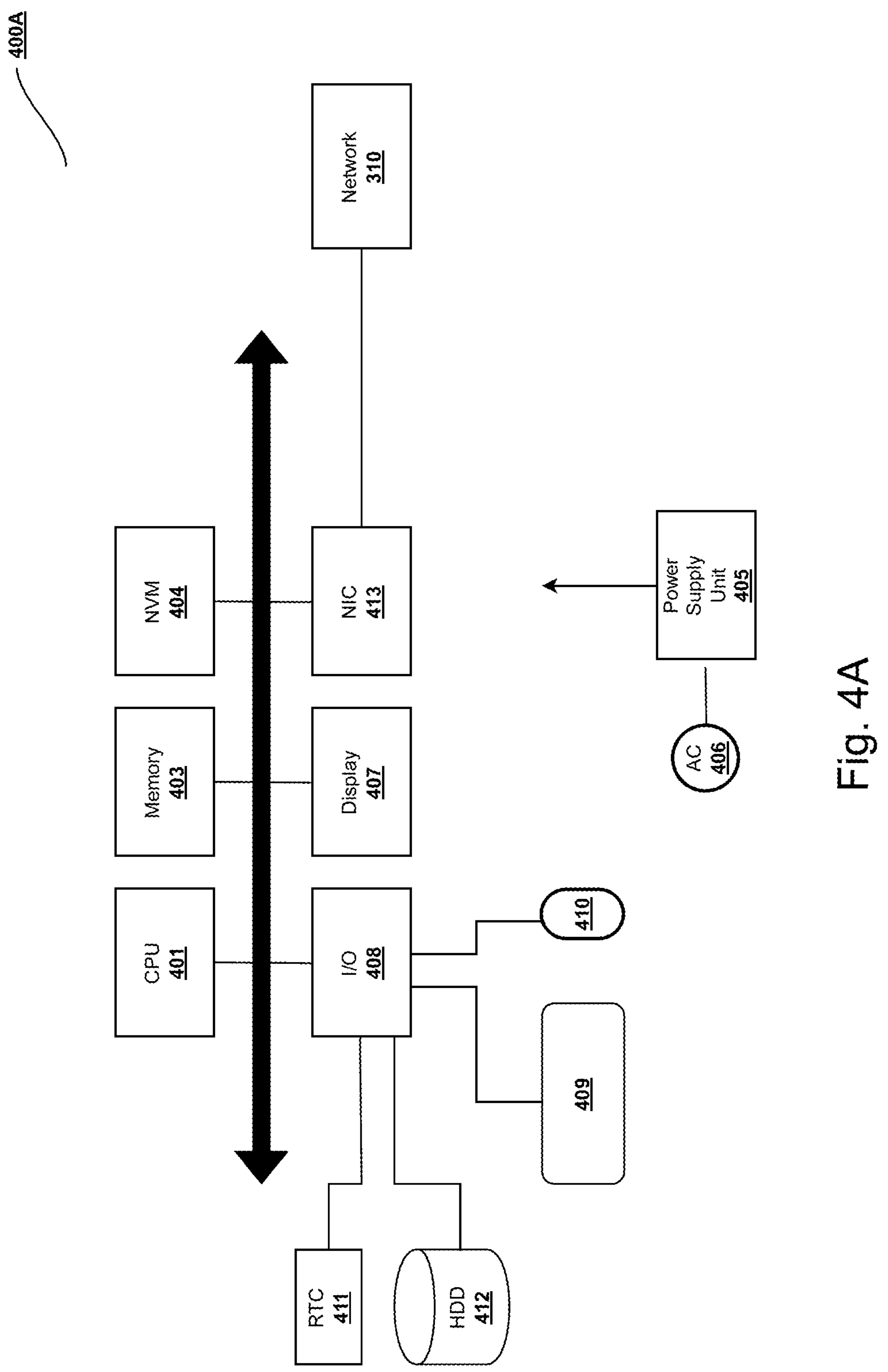
FIG. 4A is another block diagram illustrating an exemplary hardware architecture of a computing device used in various embodiments of the invention.

FIG. 4A shows an exemplary overview of a computer system 400A as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which may or may not have connections to the Internet. Also shown as part of system 400A is power supply unit 405 connected, in this example, to ac supply 406. Not shown are batteries that could be present, and many other devices and modifications that are well known but do not apply to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Figure 4B:
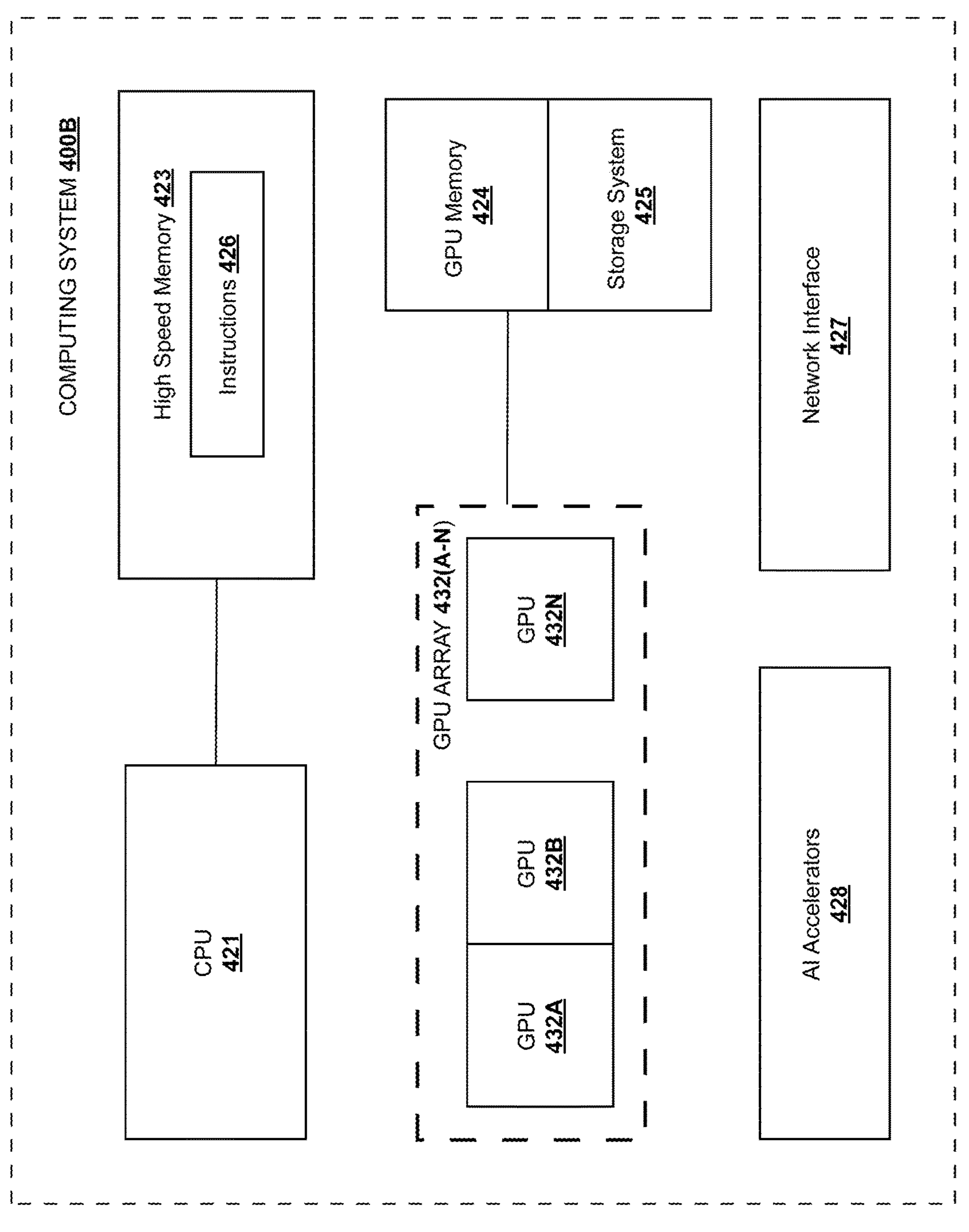
FIG. 4B illustrates an exemplary GPU-accelerated computing system architecture, according to an embodiment of the invention.

Referring to FIG. 4B, there is shown a computing system 400B configured to execute the computational methods described in this invention, in accordance with a preferred embodiment. Computing system 400B provides the computational infrastructure necessary to perform the intensive processing operations required by the system. Central Processing Unit (CPU) 421 comprises one or more high-performance processors with multi-core architecture configured to orchestrate communication between system components and manage overall workflow execution. CPU 421 executes control logic, handles API communications with external services, manages iterative processing loops, and performs sequential operations including data parsing, database queries, and coordination tasks. CPU 421 maintains bidirectional communication with high-speed memory for rapid data access and with accelerator hardware for computational offloading. In preferred embodiments, CPU 421 comprises server-grade processors with 8 to 128 cores operating at frequencies between 2.0 GHz and 5.0 GHz, providing the processing power necessary for managing concurrent operations across system components.

High-Speed Memory 423 comprises high-bandwidth random access memory (RAM) configured to store intermediate data structures, active model parameters, and working datasets during processing operations. High-speed memory 423 maintains loaded neural network model weights, active database portions, vectorized representations, intermediate computation results, and temporary data structures. Within High-Speed Memory 423 resides instructions 426 that include the executable software implementing the computational methodology described in this invention. In preferred embodiments, high-speed memory 423 comprises at least 32 GB to 512 GB of DDR4, DDR5, or HBM memory operating at speeds exceeding 3200 MHz to support rapid data access patterns required by the computational algorithms, with larger deployments utilizing up to 2 TB of memory for processing large-scale datasets.

Graphics Processing Unit (GPU) Array 432(A-N) comprises one or more graphics processing units or specialized tensor processing units configured to accelerate parallel computational operations inherent in machine learning and artificial intelligence systems. GPU Array 432(A-N) includes GPU 432A, GPU 432B, through GPU 432N, where N may range from 1 to 16 or more GPUs in distributed configurations. The array dramatically accelerates operations including matrix multiplications, convolution operations, transformer model inference, embedding generation, attention mechanisms, vector similarity computations, and other parallelizable operations common to neural network architectures. The GPUs communicate with CPU 421 via high-speed PCIe 4.0, PCIe 5.0, or CXL interconnects and with each other via NVLink, NVSwitch, Infinity Fabric, or similar GPU-to-GPU communication protocols, enabling efficient multi-GPU parallelization of large batch operations. Each GPU in the array processes different data batches simultaneously, allowing the system to handle high-throughput computational workloads. GPU Array 432(A-N) maintains bidirectional communication with GPU Memory 424 for rapid access to model parameters and computation tensors. In typical configurations, each GPU comprises NVIDIA A100, H100, L40S, AMD MI300, Intel Data Center GPU Max, or equivalent hardware with tensor cores or matrix engines optimized for AI workloads.

GPU Memory 424 comprises high-bandwidth memory (HBM2, HBM2e, or HBM3) or GDDR6/GDDR6X memory integrated with or closely coupled to the graphics processing units, providing extremely fast access to model parameters and computation tensors during neural network operations. GPU memory 424 stores neural network weights, intermediate activation values during forward and backward passes, embedding vectors for rapid similarity computations, gradient tensors during training operations, and cached computation results to minimize redundant operations. In typical configurations, each GPU in the array includes 16 GB to 192 GB of dedicated high-bandwidth memory with bandwidth ranging from 600 GB/s to 3 TB/s per GPU, enabling the rapid data movement required by modern AI architectures. GPU Memory 424 is co-located with Storage System 425, which provides persistent storage for frequently accessed data including model checkpoints, cached activations, and intermediate results. Storage System 425 comprises high-speed Non-Volatile Memory Express (NVMe) solid-state drives (SSDs) with transfer speeds exceeding 7 GB/s, enabling sub-millisecond access to critical data.

AI Accelerators 428 represent optional specialized hardware components that may supplement or replace GPU Array 432(A-N) for specific operations. AI accelerators 428 may comprise Google Tensor Processing Units (TPUs) optimized for matrix multiplication operations, custom Application-Specific Integrated Circuits (ASICs) designed for neural network inference or training, Neural Processing Units (NPUs) integrated with CPU architectures, Field- Programmable Gate Arrays (FPGAs) configured for specialized computational patterns, or other purpose-built hardware accelerators. These accelerators may be particularly advantageous for high-throughput operations, low-latency inference, specialized data transformations, or custom algorithmic implementations. AI Accelerators 428 communicate bidirectionally with CPU 421 for task coordination and data transfer. In some embodiments, AI Accelerators 428 may be deployed in a heterogeneous computing configuration alongside GPU Array 432(A-N), with the system dynamically assigning tasks to the most appropriate hardware based on workload characteristics, availability, and cost-efficiency considerations.

Network Interface 427 provides high-bandwidth connectivity to external networks and services. Network interface 427 enables bidirectional communication with external systems, cloud services, distributed computing resources, databases, and third-party APIs. Network interface 427 implements high-bandwidth connections ranging from 1 Gigabit per second (Gbps) to 400 Gbps to support concurrent operations and data transfers. The interface manages authentication via secure credential handling, implements rate limiting to respect service quotas, provides retry logic with exponential backoff for transient failures, and maintains connection pooling for efficient resource utilization.

Definitions

“Detokenization” refers to the process of bypassing tokenization and generative AI model invocation when semantic equivalence is detected between an incoming communication and previously processed inputs stored in cache. Detokenization achieves cost reduction by eliminating computational operations (tokenization, model inference, output generation) when the system recognizes that it already understands the semantic meaning of the input and has validated responses available. This contrasts with token optimization techniques (such as prompt caching) which reduce the cost per token processed but still require model invocation.

“Token” refers to the discrete unit of processing used by generative AI models, where: (a) input text is decomposed into subword tokens through tokenization algorithms; (b) each token requires dedicated computational resources including GPU memory allocation and matrix multiplication operations; (c) tokenization and detokenization operations introduce processing overhead and latency; (d) token counts determine API billing with separate pricing for input tokens and output tokens; and (e) token limits constrain maximum input and output sizes.

For example, the phrase “What are your business hours?” might tokenize to [“What”, “are”, “your”, “business”, “hours”, “?”] representing 6 tokens. Different tokenization schemes (WordPiece, BPE, SentencePiece) produce different token counts for the same text.

Detailed Conceptual Architecture

Figure 5A:
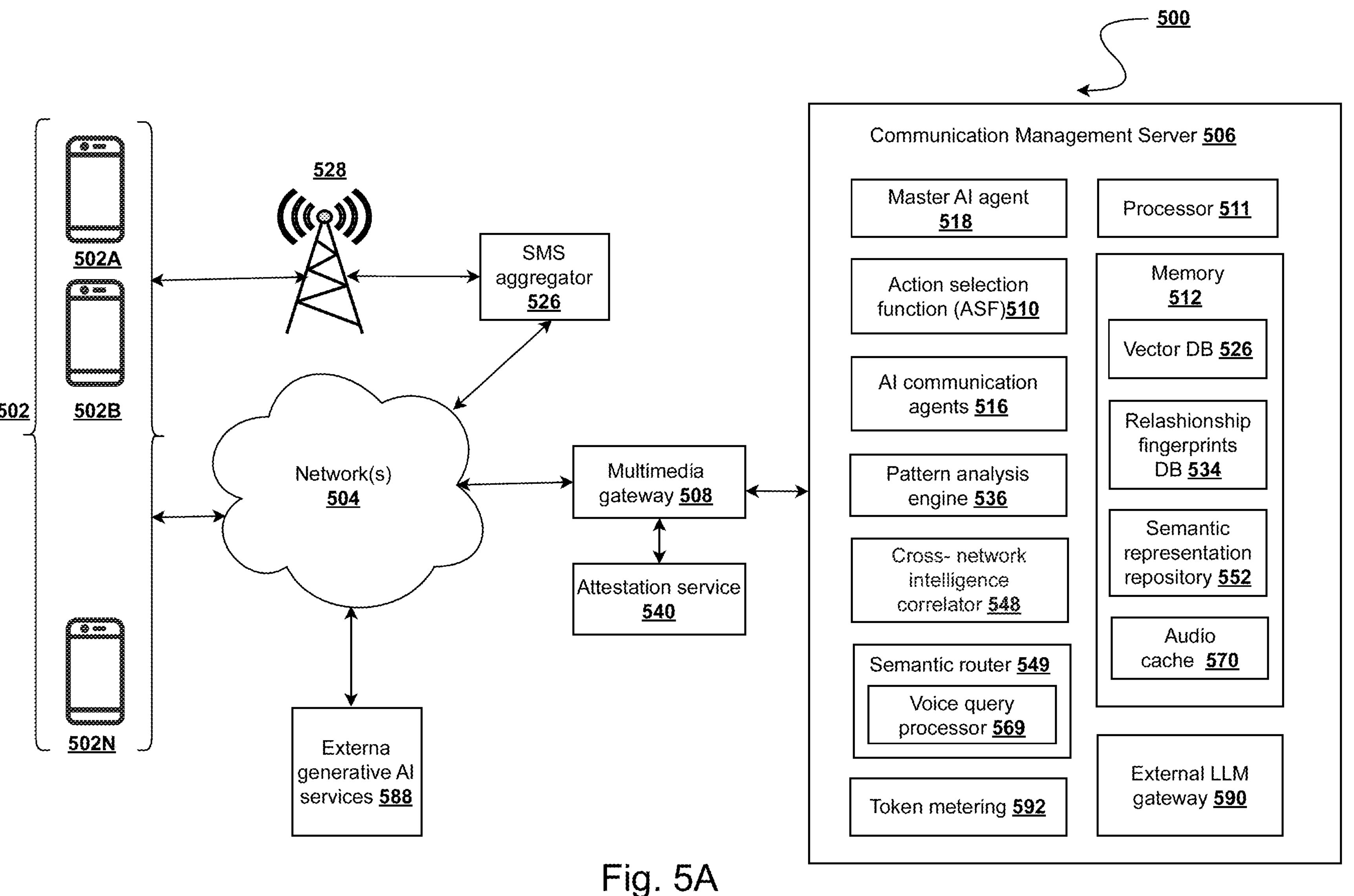
FIG. 5A is illustrates an exemplary implementation architecture of a communication management server with semantic router for optimization of AI communication, according to an embodiment of the invention.

FIG. 5A illustrates an exemplary implementation architecture of a communication management server with semantic router for optimization of AI communication, according to an embodiment of the invention.

In an embodiment, communication management server 506 is in communication with the multimedia gateway 508, which in turn may be connected through one or more networks 504 with a plurality of user devices 502A, 502B . . . 502N, (collectively referred to as user devices 502).

In an embodiment, user devices 502 may include one or more mobile devices, smartphones, general-purpose computers, tablet computers, laptop computers, smart wearable devices, voice command devices, Internet-of-Things (IoT) devices, or any other device capable of communicating with the network 504, including mobile service provider 528, and ultimately communicating through the multimedia gateway 508 with one or more components of the communication management server 506. One subset of the user devices 502 are the devices owned and used by the registered users which are being monitored for incoming communications by the multimedia gateway 508. Another subset of the user devices may be owned and used by known contacts of the registered users. The remainder may be user devices of user’s unknown to the registered user of the system.

As shown in FIG. 5, professional user devices may include a primary work device 502A (such as a desktop computer or workstation), a mobile professional device 502B (such as a smartphone or tablet), and potentially other specialized communication devices 502N (such as wearables, vehicle systems, or smart office equipment). These devices are configured with the professional’s preferences, authentication credentials, and domain-specific settings that enable AI orchestration framework to make appropriate decisions aligned with the professional’s needs and ethical obligations.

In an embodiment, a device owner first registers an account with the communication management server 506 for their devices, thereby becoming a registered user, and sets initial preferences, regarding contacts and hours and the user’s goals if the user wishes. In an embodiment, registered user devices 502 may connect using a progressive web application that uses WebRTC for communications data exchange and registration. Further, the user may answer a series of questions that set their initial objective reward function based on a holistic view of their lifestyle and short-term and long-term goals. After the registered user is set up, incoming communications to the registered user’s devices are handled by communication management server 506.

In an embodiment, communication management server 506 may include a processor 511 and a plurality of programming instructions stored in a memory 512. The instruction when executed may be configured to manage incoming communications for registered user devices. Communication management server 506 may be configured to communicate with user devices 502 via the multimedia gateway 508, which may serve as an intermediary between one or more networks 504 and communication management server 506.

In an embodiment, multimedia gateway 508 receives an incoming communication notification from the communication networks 504 including signaling and routing information as well as originating and terminating user identification information from among the plurality of user devices 502. Multimedia gateway 508 responds with appropriate information to pause the communications process while it is processed by communication management server 506. Multimedia gateway 508 may be configured to communicate signaling and routing information along with originating and destination user identification information from among a plurality of users 502 associated with an individual incoming communication from an originating network 504.

In an embodiment, multimedia gateway 508 may be configured to make use of existing third-party attestation data from a third-party attestation service 540 if available. This brings additional contextual data relating to a telco customer and the source of the incoming call. This additional data may be added to the interaction graph 520 to further improve the decisions made by the master AI agent 518 when handling the incoming call.

In an embodiment, master AI agent 518 may be configured to initiate actions for incoming communication. The actions taken on behalf of the user may be in alignment with the user's short-term and long-term goals.

During operation, based on the information available in the system, a current state of the environment is generated and master AI agent 518 may invoke the action selection function (ASF) 510 to determine the action to take to process the incoming communication. The action selected by ASF 510 may be executed by the master AI agent 518 using the multimedia gateway 508 and/or AI communication agent. For example, the action may be to send an instruction directly to the multimedia gateway 508 to block the incoming call, or the master AI agent 518 invoke one or more generative AI communication agents 516 to perform additional sub-tasks according to different agentic roles before sending an instruction to the multimedia gateway 508.

For some incoming communications, the action chosen by the ASF 510 and executed by the master AI agent 518 may be a complex one requiring the master AI agent 518 to invoke an AI communication agent 516.

In an embodiment, AI communication agents 516 represent a sophisticated subsystem of specialized AI agents designed to interact with external parties according to specific roles and contexts. AI communication agents 516 serve as the system's primary interface for direct communication with callers and other external parties.

AI communication agents 516 serve as sophisticated intermediaries that facilitate communication while respecting strict professional boundaries. They receive high-level instructions from master AI Agent 518, leverage relationship context from the interaction graph 520, follow professional preferences defined in user preferences 524, maintain conversation coherence through conversation state manager 542, adapt their communication mode based on directions from communication mode orchestrator 544, and utilize appropriate interfaces as determined by transducer interface coordinator 546.

In an embodiment, AI communication agents 516 are generative AI models that use natural language processing to extract preferences from conversations, emails, and messaging history to infer optimal communication hours, interests for conversation topics, and priority contacts. In an embodiment, AI communication agents 516 operate in the framework of retrieval augmented generation, declarative model building, and collective reasoning under the control of the master AI agent 518.

The AI agents in the communication management system are more than simple generative AI agents and may utilize Machine Learning (ML) techniques to continuously improve their decision-making capabilities. This involves:

- Data Collection: Gathering historical data on incoming communications, user preferences, actions taken, and outcomes.
- Feature Extraction: Identifying key features from the collected data that are relevant for decision-making, such as sender attributes, communication type, content keywords, and user feedback.
- Model Training: Using the extracted features to train ML models, such as decision trees, support vector machines, deep neural networks, or graph neural networks to predict the best actions for handling incoming communications.
- Model Evaluation: Testing the trained models on a separate dataset to assess their performance and make any necessary adjustments.
- Online Learning: Continuously updating the ML models based on new data and user feedback to adapt to changing user preferences and communication patterns.
- Unsupervised Learning: Applying techniques such as clustering and dimensionality reduction to identify hidden patterns and structures within the data, which can provide insights and improve the decision-making process.

By leveraging ML techniques, AI agents can learn from past experiences and improve their ability to make optimal decisions that align with the user's goals and preferences.

In an embodiment, different AI communication agents 516 may be configured to support different types of communications. For example, a first AI communication agent may be associated with performing voice-based actions, a second AI communication agent may be associated with handling email communication, and a third AI communication agent may be associated with incoming text messages.

During the processing of the incoming communication, an AI communication agent 516 may be utilized by master AI agent 518 to generate communication content for the incoming communication. In some cases, AI communication agents 516 may analyze communication content.

In addition to machine learning and generative AI techniques, AI communication agents may employ more conventional Natural Language Processing (NLP) techniques to analyze and understand the content of incoming communications. This includes:

- Tokenization: Breaking down the text into individual words or tokens.
- Part-of-Speech (POS) tagging: Identifying the grammatical role of each word (e.g., noun, verb, adjective) to understand the structure of the sentences.
- Named Entity Recognition (NER): Identifying and classifying named entities such as people, organizations, locations, and dates.
- Sentiment Analysis: Determining the sentiment (positive, negative, or neutral) expressed in the communication to gauge the emotional tone.
- Intent Recognition: Identifying the purpose or goal of the communication, such as making a request, asking a question, or expressing a complaint.

By applying these NLP techniques, the AI communication agents can extract meaningful information from the incoming communications, which is then used by the master AI agent to make informed decisions on how to handle each communication based on the user's preferences and the interaction graph.

In an embodiment, communication management server 506 may include a blacklist/whitelist data 514. This may be used to avoid unnecessary repeating of reasoning to determine whether an incoming multimedia communication should be immediately blocked or be connected for further processing. The data may also be prepopulated through the 3$^{rd}$ party attestation service or user preferences. The data may be configured with an expiry timeout.

In an embodiment, communication management server 506 may include a vector DB 526 which is a specialized type of database designed to efficiently handle vector embeddings, which are high-dimensional vectors used to represent complex data items in a form suitable for machine learning algorithms, particularly in the context of similarity search operations or compressed representations of graph data.

The action selected by the action selection function ASF may be executed by a function call from the master AI agent 518 to an internal application programming interface (API). Some function calls are executed on the multimedia gateway, but a selected action may require the master AI agent to perform additional sub-tasks including the selection and configuration of AI communication agents to co-operate to further analyze content, or for generating new multimedia content, perform additional limited reasoning and estimations and so on. On completion of such sub-tasks or in the event of a timeout, the master AI agent 518 may send a completion message back to the multimedia gateway 508 that specifies any final external actions for multimedia gateway 508 to continue handling user devices.

In an embodiment, multimedia gateway 508 and communication management server 506 may operate in the cloud, and master AI agent 518 may perform functions when one or even all of the registered user's devices are offline or even powered down. This enables a high degree of intelligent communication handling, content analysis, and generation to occur even in the complete absence of the registered user and their devices.

In an embodiment, communication management server 506 may be implemented as a set of microservices for each of the various components of communication management server 506 running in containers. In an embodiment, the multimedia gateway 508 may be software that sits in front of an application programming interface (API) or group of microservices to facilitate requests and delivery of data and services between user devices 502 and the communication management server 506. Its primary role may be to act as a single-entry point and standardized process for interactions between the communication management server 506, and the external networks 504, user devices 502, and other external devices.

In another embodiment, the components of the communication management server 506 and multimedia gateway 508 may be implemented as containerized microservices that run in a cloud computing environment. The use of containerization is important in that service instances can be spun up in near-real-time and then made inactive when no longer required. Certain elements such as the multimedia gateway 508 need to be running continuously but can be shared through multi-tenant configuration. The architecture is provided with telco-grade security with encryption, data isolation, access controls, key management, and auditing. Communications are encrypted in transit and at rest using TLS, HTTPS, and AES standards. AI communication agents 516 processing may be isolated through containerization and private cloud tenants. Granular role-based access control may be used for managing user and agent permissions. Secrets and keys follow principles of least privilege and rotation. Detailed security event logging provides transparency and supports forensic analysis. User authentication may include Password, 2FA, SSO, and biometrics.

In an embodiment, a pattern analysis engine 536 to identify communication patterns and extract pattern characteristics. Communication patterns are indicative of how users interact with each other. Communication patterns for every relationship (interaction between two users) may include, but is not limited to, timing of responses, preferred communication channels, and frequency of contact. Communication patterns naturally evolve and become more sophisticated as relationships develop, creating unique fingerprints.

Pattern analysis engine 536 may analyze communication metadata to determine communication patterns between the parties. The parties are a user device associated with the incoming call and the first-user device which is the recipient of the incoming communication.

In an embodiment, the communication patterns may be temporal patterns that identify the time when communications occur, the frequency of interactions between the user devices, the duration of communication, and intervals between interactions. In some cases, the frequency of interaction may be used for tracking trends including, but not limited to, increasing or decreasing interaction frequency, patterns in communication volume, and variations across different time periods. Further, pattern analysis engine 536 may track these temporal patterns to identify characteristics such as response times, preferred communication hours, and changes in these temporal patterns over time.

In an embodiment, the communication patterns may be channel patterns that identify the preferred communication channels (voice, text, email, etc.) between the parties. Further, Further, pattern analysis engine 536 may track shifts in channel preferences over time.

In an embodiment, the communication patterns may be response behavior patterns that identify the time taken by parties to respond to each other, the consistency of responses, and any changes in response patterns that might indicate shifts in relationship dynamics.

In an embodiment, relationship fingerprints stored at relationship fingerprints database 534 may provide the unique characteristics of communication relationship between two parties and it may include temporal patterns (timing, frequency, duration), channel preferences patterns (voice, text, email), response behaviors (speed, consistency), engagement levels, and relationship context. In an embodiment, relationship fingerprints database 534 implements a hierarchical structure that organizes communication patterns at multiple levels-individual relationships, organizational relationships, and network-wide patterns. Each level maintains its own set of pattern characteristics while enabling cross-referencing for pattern validation. The database architecture supports real-time pattern matching while continuously incorporating new pattern observations, creating an evolving knowledge base of communication behaviors.

Relationship fingerprints database 534 may be constantly updated with the processing of new incoming communications. Relationship fingerprints offer relationship characteristics and may be indicative of established communication behaviors. The fingerprint continuously evolves as the relationship develops, making it increasingly precise in distinguishing legitimate communications from unwanted ones. Each relationship generates its own unique fingerprint that adapts over time, enabling sophisticated pattern matching while preserving complete privacy since no message content is ever accessed or stored.

In an embodiment, communication management server 506 stores aggregated patterns used across services and networks in pattern database.

In an embodiment, communication management server 506 provides a sophisticated AI orchestration framework that functions as an intelligent telephone receptionist for high-value professionals in legal, healthcare, financial, real estate, executive, and consulting fields.

In an embodiment, vector DB 526 operates as a distributed microservice cluster utilizing consistent hashing for data distribution across multiple nodes. The service implements read replicas for query optimization and employs eventual consistency models for high availability. Integration with distributed storage systems ensures persistent data allocation and automated backup procedures.

In an embodiment, a centralized API gateway manages all external communications to communication management server 506, implementing rate limiting, authentication, and request routing. An API gateway provides traffic management with automatic SSL/TLS termination and automated certificate management.

Distributed storage management discovery enables automatic service registration and health monitoring. Distributed service coordination enables automatic service registration and health monitoring. Services communicate through logical service identifiers, eliminating hardcoded network addresses and enabling dynamic scaling without service interruption.

In an embodiment, pattern analysis engine 536 may analyze communication metadata to identify multi-dimensional patterns across temporal, channel, and behavioral domains without accessing communication content. Pattern analysis engine 536 employs sophisticated algorithms including time series analysis, frequency analysis, pattern recognition, and behavioral modeling techniques to extract metadata elements such as timestamp, channel type, duration, and other available metadata from incoming communications. Pattern analysis engine 536 continuously updates relationship fingerprints stored in relationship fingerprints database 534 and coordinates with the cross-network intelligence correlator 548 to validate patterns across different services and networks.

In an embodiment, cross-network intelligence correlator 548 implements the cross-pollination analysis capability that identifies, validates, and leverages communication patterns across different services and networks to create a self-strengthening security and trust framework. Cross-network intelligence correlator 548 abstracts and normalizes common patterns into standardized formats that can be compared and shared across different parts of the ecosystem, removing service-specific elements while preserving essential pattern characteristics.

Cross-network intelligence correlator 548 may generate correlation results that integrate with individual attribute scoring by providing validated pattern signatures that enhance trust level calculations. Correlator 548 may create a self-strengthening security framework where patterns validated across email, voice, and messaging services strengthen individual trust attribute calculations, enabling dynamic trust levels that adapt based on collective intelligence while maintaining privacy through metadata-only analysis. Cross-network intelligence correlator 548 validates identified patterns through consistency checking across services, correlation with known legitimate patterns, absence of conflicting pattern indicators, and alignment with expected relationship behaviors. Validated patterns are distributed throughout the ecosystem as aggregated patterns stored in pattern database 538, enhancing the pattern recognition capabilities of all nodes in the network while maintaining strict privacy boundaries. During operation, cross-network intelligence correlator 548 performs similarity analysis across email, voice, and SMS patterns, conducts cross-channel pattern correlation, and compares current communication patterns against known attack patterns to enable proactive threat identification and legitimate communication validation.

Cross-network intelligence correlator 548 compares current patterns against aggregated patterns stored in pattern database 538 to identify consistency with known legitimate behaviors or similarity to recognized threat patterns.

Components for Semantic Routing and Voice AI

For communications destined for AI services, semantic router 549 provides semantic routing that bypasses expensive tokenization when semantic equivalents exist in cache. The architecture integrates pattern-based decision manager 532 with cross-network intelligence correlator 548 and trust score generator 547 for privacy-preserving communication validation. During operation, incoming communications are classified at decision point: AI-destined communications route to semantic router 549 for cost processing, while standard communications utilize ASF 510 for reinforcement learning-based processing. This dual-path architecture enables the system to optimize AI service costs through semantic routing while maintaining sophisticated communication management capabilities for non-AI interactions, creating unified platform that addresses both domains within single server infrastructure.

In an embodiment, communication management server 506 may implement semantic router 549 for determining whether incoming communications destined for AI services should be processed using cached responses, hybrid template-based assembly, or full generative AI processing. Semantic router 549 implements a core "detokenization" capability by recognizing when the semantic meaning of an input is already understood and can be served without invoking expensive tokenization and generative AI processing.

In one exemplary embodiment, semantic encoder 550 may be implemented using the sentence-transformers library (https://www.sbert.net) with the 'all-MiniLM-L6-v2' model, which accepts text input up to 256 tokens, generates 384-dimensional dense embeddings, achieves 50 ms inference latency on CPU, and maps semantically similar sentences to cosine similarity >0.85.

In some alternative embodiments, semantic encoder 550 may be implemented using OpenAI®text-embedding-ada-002 (1536 dimensions), Google®Universal Sentence Encoder (512 dimensions), Cohere embed-english-v3.0 (1024 dimensions). The specific model selection trades off between embedding quality, inference speed, and dimensionality based on deployment constraints.

In an embodiment, semantic representation repository 552 may store cached semantic objects with dense embedding vectors representing the semantic meaning of previously processed inputs along with their corresponding responses. Cached semantic object refers to an entry in the semantic representation repository with a dense embedding vector representing semantic content, an intent identifier or semantic label for human-readable categorization, an associated response (text content or reference to audio waveform). Further, the cached semantic objects may also include quality metrics (initial quality score, average quality across retrievals, and quality variance), usage statistics (creation timestamp, last access timestamp, total retrieval count), cache hit rate contribution; and cache management metadata (priority ranking, eviction eligibility, and relationship to other cached objects.)

In a preferred embodiment, the quality metric stored with each cached semantic object is computed from historical interaction outcomes through an exponential moving average that balances recency with stability. For each retrieval of a cached semantic object, the system collects interaction outcome signals including:

Explicit feedback: user ratings (1-5 stars mapped to 0.0-1.0), thumbs up/down (1.0/0.0), satisfaction surveys Implicit positive signals: conversation continuation beyond the response (weight 0.7), task completion indicators such as successful transaction or appointment booking (weight 1.0), user query resolved without follow-up clarification (weight 0.8)

Implicit negative signals: immediate conversation abandonment (weight 0.0), user rephrasing the same query (weight 0.2), explicit correction or complaint (weight 0.1), escalation to human agent (weight 0.3)

As used herein, a "dense embedding vector" refers to a continuous-valued numerical vector representation where: Each dimension contains a real-valued number (typically float32), dimensionality ranges from 128 to 768 dimensions, most or all dimensions contain non-zero values (>90% non-zero), and vectors capture semantic meaning such that semantically similar inputs map to nearby points in vector space (measured by cosine similarity or Euclidean distance). This contrasts with "sparse embeddings" (e.g., TF-IDF vectors) where >90% of dimensions are zero. Additionally, the system maintains historical statistics for each cached semantic object. Historical statistics for each cached semantic object may include, but are not limited to retrieval count (total number of times the cached object has been retrieved), quality variance (running variance of outcome scores, computed as exponential moving variance), last_retrieval_timestamp (timestamp of most recent retrieval) and quality trend (slope of quality metric over recent retrievals, indicating improving or degrading quality)

Dense embedding vectors provide a compressed semantic representation that captures meaning in far fewer bytes than storing all possible input variations, enabling larger effective vocabularies of understood intents within fixed storage constraints. The dense embedding vector captures semantic meaning of the incoming communication by encoding the input into a continuous vector space where semantically similar inputs map to nearby points regardless of surface-level variation.

Semantic representation repository 552 may implement efficient nearest-neighbor search capabilities using vector database technologies optimized for high-dimensional similarity queries. Each stored semantic representation includes the original input embedding, the validated response, quality metrics from prior interactions, and metadata for cache management including timestamps and usage frequency.

The semantic representation repository provides semantic generalization and unlike exact-match caching systems that require identical inputs, semantic representation repository 552 enables matching across semantically equivalent but lexically different inputs. Dense embedding vectors enable semantic matching independent of surface-level linguistic variation, allowing "What time do you close?" and "When do you shut down?" to generate similar vectors despite different word choices. This dramatically increases effective cache coverage. A single cached response can serve hundreds of different phrasings expressing the same intent.

In an exemplary embodiment, semantic representation repository 552 is implemented using a vector database optimized for approximate nearest neighbor (ANN) search, such as Pinecone: Cloud-native vector database with sub-50 ms query latency Milvus: Open-source vector database with GPU acceleration support Weaviate: Vector search engine with hybrid keyword+vector queries FAISS: Facebook AI Similarity Search library for dense vectors The repository maintains an inverted index structure:

Index: embedding_vector→{response_id, audio_cache_ref, quality_score, timestamp, usage_count}

Query operations may use HNSW (Hierarchical Navigable Small World) algorithm providing O (log N) search complexity for N cached embeddings, enabling sub-10 ms similarity search across repositories with 10M+cached responses.

In an embodiment, audio cache 570 may store pre-computed audio waveforms corresponding to validated responses. Unlike text caching which stores character sequences, audio cache 570 stores actual audio waveform data optimized for rapid retrieval and playback. The audio cache implements codec-aware storage supporting multiple audio formats including G.711 for PSTN compatibility, Opus for VOIP applications, and WebRTC formats for browser-based communications. Audio quality preservation during storage and retrieval ensures that cached responses maintain natural speech characteristics including prosodic features, timing, and clarity.

In an embodiment, external generative AI services 588 (also referred as external AI services) represent third-party generative AI platforms including large language models, voice synthesis services, and multimodal AI systems that provide full generative processing capability when cached or hybrid responses are insufficient. An external LLM gateway 590 may be implemented to manage communication with external AI services 588, implementing rate limiting, authentication, request formatting, and response parsing. External LLM gateway 590 abstracts the specifics of individual AI service APIs, enabling the system to utilize multiple AI providers interchangeably based on cost, latency, and capability requirements.

In an embodiment, token metering 592 may be configured to track token consumption across all AI service invocations, providing real-time visibility into cost accumulation and enabling cost-based routing decisions. Token metering 592 captures both input and output token counts for each AI service invocation, calculates costs based on current pricing, and provides data for reward-based learning optimizer 564 to refine routing thresholds. The metering data enables the system to quantify the cost savings achieved through semantic routing compared to full generative processing.

In an embodiment, token metering 592 computes token cost by counting input tokens, applying tokenizer (e.g., tiktoken for GPT models) to input communication to determine input token count, counting output tokens (applying tokenizer to generated response to determine output token count), applying pricing (multiplying token counts by current API pricing (e.g., \$0.005/1K input tokens, \$0.015/1K output tokens for GPT-4), and summing costs:

$$\text{Total Cost} = (\text{Input Tokens} \times \text{Input Price}) + (\text{Output Tokens} \times \text{Output Price})$$

Semantic Router and Voice Query Processor Architecture

Figure 5B:
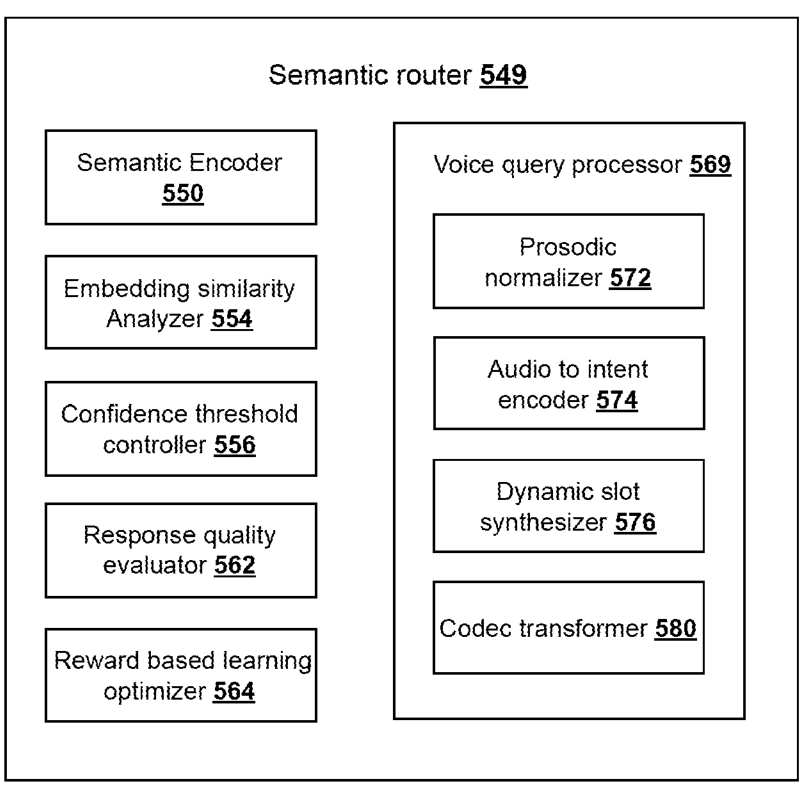
FIG. 5B illustrates the detailed architecture of semantic router, according to an embodiment of the invention.

FIG. 5B illustrates the detailed architecture of semantic router 549, according to an embodiment of the invention. A semantic encoder 550 may transform input communications into dense embedding vectors that capture semantic meaning in a high-dimensional vector space. For text inputs, semantic encoder 550 may utilize transformer-based language models to generate contextual embeddings that represent the meaning of the input independent of specific word choices. In an exemplary embodiment, the dense vector representation comprises 384 to 768 dimensions in the semantic embedding space. Semantic encoder 550 may normalize varied input representations into a consistent embedding space, enabling comparison across inputs that may differ in length, structure, vocabulary, or even modality while preserving semantic equivalence.

In an embodiment, embedding similarity analyzer 554 may compute similarity scores between incoming input embeddings and stored semantic representations in semantic representation repository 552. The analyzer employs efficient approximate nearest neighbor algorithms optimized for high-dimensional vector spaces, enabling rapid similarity computation even with large cached response repositories. Implementation of approximate nearest neighbor algorithms enables sub-linear search complexity, providing 100-1000× speedup compared to brute-force similarity computation while maintaining high recall of true nearest neighbors.

In an embodiment, confidence threshold controller 556 implements the adaptive routing logic that determines whether to serve cached responses, use hybrid template-based assembly, or invoke full generative AI processing. The controller maintains configurable threshold values that define the similarity score boundaries between these processing tiers. A first threshold $T_1$ (example, approximately 0.95) defines the minimum similarity required for direct cache retrieval, while a second threshold $T_2$ (example, approximately 0.70) defines the boundary below which full generative processing is required.

A three-tier architecture enables graduated resource consumption proportional to request complexity. A direct cache retrieval (tier-1) is used when similarity score $\geq T_1$. The response is retrieved directly from semantic representation repository 552. Processing cost is approximately $0.00 as no tokenization or generative model invocation occurs. This tier achieves response latency of 10-50 milliseconds. A hybrid templated assembly (tier-2) is used when $T_2 \leq$similarity score $<T_1$, the system generates a composite response by combining static segments from semantic representation repository 552 with AI-generated dynamic content. Processing cost is approximately $0.01-$0.05 as only dynamic elements require generative processing while static content is served from cache. A full generative processing (tier-3) path is selected when similarity score $<T_2$, the input communication is transmitted to external generative artificial intelligence service 588 for full processing. Processing cost is approximately $0.25-$0.35 per minute for voice AI interactions.

This graduated architecture provides higher effective cache coverage than binary systems. The intermediate hybrid tier captures requests that would require full generation in a two-tier system but can be partially served from cache, significantly expanding effective cache coverage.

Similarity scores between these thresholds trigger hybrid processing that combines cached content with AI-generated dynamic elements. The threshold values are dynamically adjusted based on feedback from response quality evaluator 562 and reward-based learning optimizer 564.

In an embodiment, reward-based learning optimizer 564 may implement reinforcement learning techniques to continuously optimize routing thresholds and caching strategies based on accumulated quality feedback and cost data. The optimizer defines reward functions that balance response quality against token consumption costs, enabling the system to find optimal operating points that maximize quality while minimizing AI service costs. Over time, reward-based learning optimizer 564 learns domain-specific patterns that improve cache hit rates while maintaining response quality, achieving progressively higher cost reductions as the system matures.

In an embodiment, voice query processor 569 may provide specialized processing capabilities for audio input modalities. Audio to intent encoder 574 may convert incoming audio streams directly into semantic intent representations without requiring intermediate speech-to-text conversion. This direct audio-to-intent encoding eliminates transcription latency (typically 100-500 ms) and prevents transcription errors from propagating to downstream intent classification. This direct audio-to-intent encoding enables efficient processing of voice inputs while preserving acoustic features that may inform response selection. The encoder generates both semantic vectors representing the meaning of the spoken content and acoustic vectors capturing prosodic and speaker characteristics.

In a preferred embodiment, audio to intent encoder 574 implements a direct audio-to-semantic encoding architecture based on wav2vec 2.0 or HuBERT (Hidden Unit BERT) foundational models. The encoder comprises three processing stages: (a) a convolutional feature encoder that processes raw audio waveforms sampled at 16 kHz and generates latent speech representations at 50 Hz (one representation per 20 ms of audio); (b) a transformer encoder stack comprising 12 to 24 transformer layers with hidden dimension of 768 to 1024, processing the latent representations through self-attention mechanisms to capture long-range acoustic dependencies; and (c) a projection head that maps the contextualized representations to the shared semantic embedding space of dimensionality D (typically 384-768 dimensions matching text encoder output dimensionality).

In an exemplary implementation, audio to intent encoder 574 utilizes a pre-trained wav2vec 2.0 BASE model (12 transformer layers, 768 hidden dimensions, 95M parameters) or wav2vec 2.0 LARGE model (24 transformer layers, 1024 hidden dimensions, 317M parameters) available from open-source repositories including Hugging Face Transformers library and Fairseq. The model accepts raw audio input without preprocessing beyond resampling to 16 kHz, eliminating the need for traditional acoustic feature extraction (MFCC, filterbanks) or intermediate speech-to-text transcription.

The projection head comprises a linear transformation layer followed by layer normalization:

$$\text{semantic\_vector} = \text{LayerNorm}(\text{W\_proj}) \times \text{pooled\_output} + \text{b\_proj}$$

where W_proj is a learnable weight matrix of dimensions [transformer_hidden_dim×semantic_embedding_dim], b_proj is a bias vector, and pooled_output is obtained by mean pooling across the temporal dimension of the final transformer layer outputs. This architecture enables end-to-end gradient flow from semantic similarity objectives through the transformer stack to the convolutional frontend, allowing fine-tuning on domain-specific audio-intent pairs.

For acoustic vector generation supporting prosodic matching, a parallel branch extracts acoustic features including: fundamental frequency (F0) contour extracted using CREPE or PYIN algorithms at 100 Hz frame rate; energy envelope computed as RMS amplitude per 10 ms frame; speaking rate computed as syllables per second using peak detection on the energy envelope; and voice quality features including jitter, shimmer, and harmonics-to-noise ratio. These acoustic features are concatenated into an acoustic vector of approximately 64-128 dimensions, stored alongside the semantic vector for prosodic matching during response selection.

In an embodiment, audio cache 570 may store pre-computed audio waveforms corresponding to validated responses. Unlike text caching which stores character sequences, audio cache 570 may store actual audio waveform data optimized for rapid retrieval and playback. The audio cache implements codec-aware storage supporting multiple audio formats including G.711 for PSTN compatibility, Opus for VoIP applications, and WebRTC formats for browser-based communications. By caching audio waveforms rather than text responses, the system eliminates the computationally expensive text-to-speech synthesis step for cached responses.

In an embodiment, prosodic normalizer 572 processes cached audio segments to ensure natural speech flow when assembling hybrid responses from multiple audio sources. The normalizer adjusts pitch contours, timing, and energy levels to create seamless transitions between cached static segments and dynamically generated audio elements. Prosodic features include pitch contour (fundamental frequency over time), rhythm pattern (timing and duration of speech segments), and energy envelope (amplitude variations). The normalizer applies raised cosine windowing at segment boundaries according to:

$$w(n) = 0.5 \times \left(1 - \cos\left(2\pi n/(N\text{-}1)\right)\right)$$

where N is the window length in samples. This crossfade process eliminates audible discontinuities at segment boundaries that would otherwise make assembled responses sound unnatural.

In an embodiment, dynamic slot synthesizer 576 may generate audio for dynamic elements that cannot be pre-cached, such as names, dates, times, account numbers, and other variable content. The synthesizer coordinates with external AI services when necessary to generate these dynamic audio segments, which are then seamlessly integrated with cached static segments through prosodic normalizer 572. Crossfade processing at segment boundaries ensures smooth audio transitions.

In an embodiment, codec transformer 580 may handle audio format conversion to match the requirements of different delivery channels. Codec transformer 580 may support transcoding between G.711 (mu-law and A-law) for traditional PSTN telephony, Opus for modern VoIP applications, and WebRTC-compatible formats for browser-based communications. Support for legacy codecs ensures compatibility with traditional PSTN infrastructure, enabling voice AI optimization benefits to reach users on any telephone regardless of technology.

In an embodiment, response quality evaluator 562 may assess the quality of generated responses across multiple dimensions to provide feedback for threshold optimization. Quality metrics include cache hit rates measuring the percentage of requests served from cache, response quality feedback derived from user interactions and explicit ratings, slot accuracy for hybrid responses measuring correct dynamic element insertion, latency measuring response time, and prosodic naturalness for audio responses measuring speech quality characteristics.

In an embodiment, token metering 592 may track token consumption across all AI service invocations, providing real-time visibility into cost accumulation and enabling cost-based routing decisions. Token metering 592 captures both input and output token counts for each AI service invocation, calculates costs based on current pricing, and provides data for reward-based learning optimizer 564 to refine routing thresholds. The metering data enables the system to quantify the cost savings achieved through semantic routing compared to full generative processing. In an exemplary deployment, token metering demonstrates:

Detailed Description of Exemplary Embodiments

Figure 6:
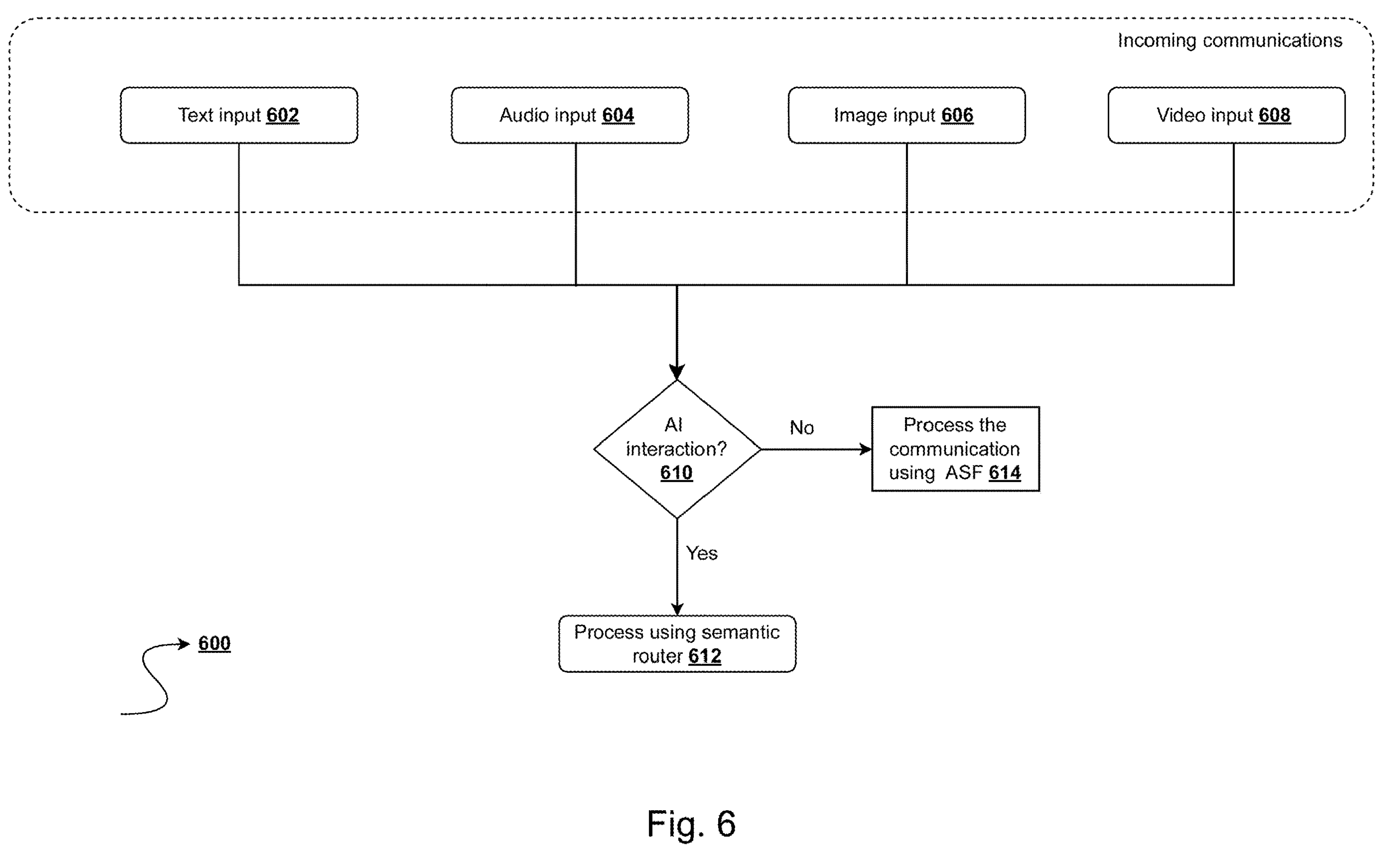
FIG. 6 illustrates a flow diagram of an example method for routing incoming communications based on whether they are destined for AI services or standard communication processing, according to an embodiment of the invention.

FIG. 6 illustrates an example flow diagram of an example method 600 for routing incoming communications based on whether they are destined for AI services or standard communication processing. The AI communications may be routed to semantic router and non-AI communications processed using action selection function.

Method 600 receives incoming communications that may include text input 602, audio input 604, image input 606, or video input 608. These multiple input modalities reflect the generalized applicability of the semantic routing approach to any form of AI interaction, not limited to voice communications.

At step 610, processor 511 determines whether the incoming communication is destined for AI interaction. This determination may be based on explicit routing indicators, content analysis, or configuration settings that designate certain communication channels or patterns as AI interactions.

When the communication is determined to be an AI interaction, at step 612 processor 511, may process the communication using semantic router 549. Semantic router 549 applies the detokenization methodology to determine whether the communication can be served from cache, requires hybrid processing, or necessitates full generative AI processing. This routing decision enables significant cost optimization by avoiding unnecessary tokenization and generative processing for inputs with known semantic equivalents.

When the communication is not an AI interaction, at step 614 the system processes the communication using the action selection function (ASF) 510.

Figure 7:
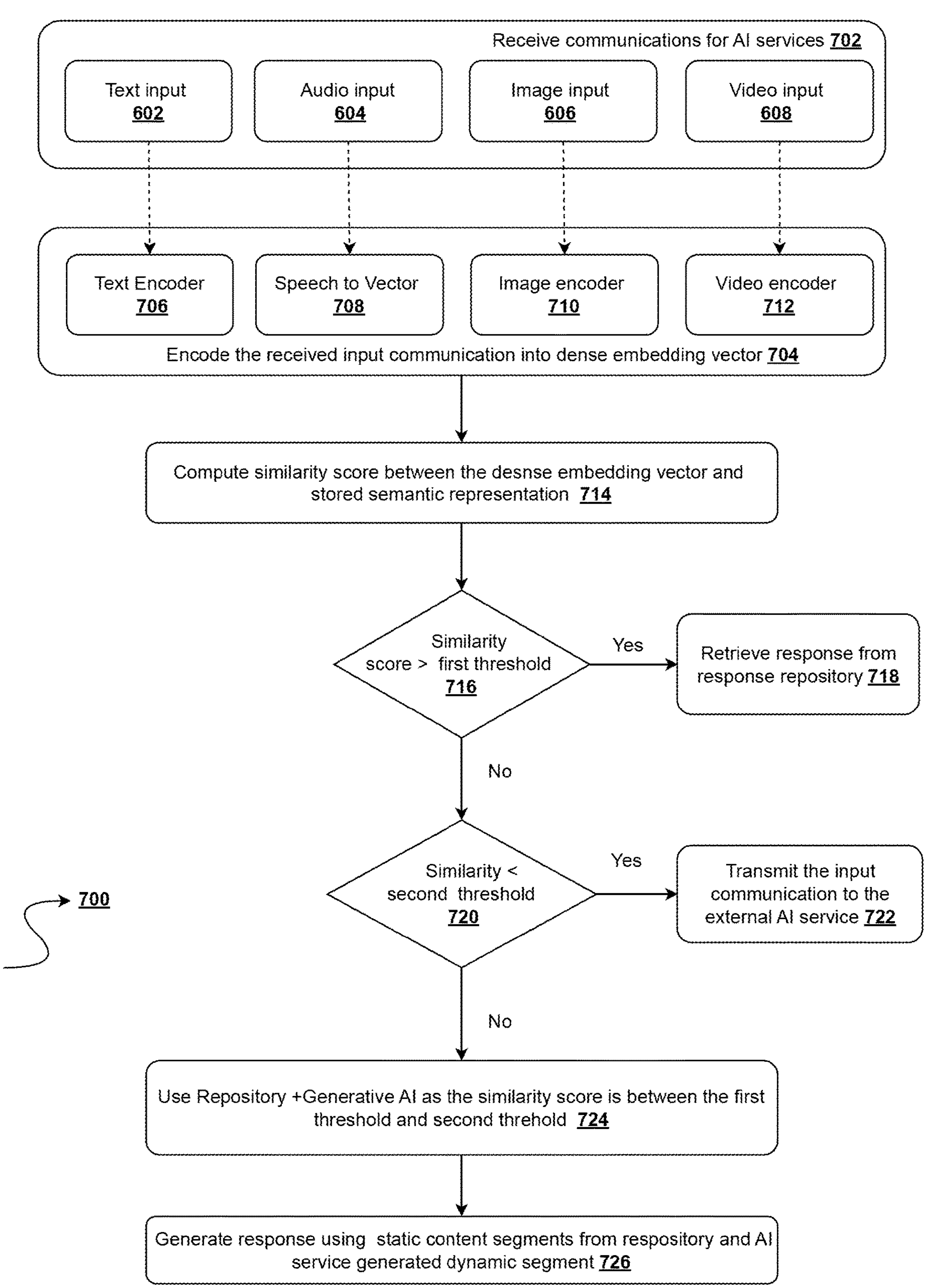
FIG. 7 illustrates a flow diagram of an example method for semantic routing of AI service requests supporting multiple input modalities including text, audio, image, and video, according to an embodiment of the invention.

FIG. 7 illustrates an example flow diagram 700 for semantic routing of AI service requests supporting multiple input modalities including text, audio, image, and video. Modality-specific encoders project inputs into a shared semantic embedding space for three-tier routing based on similarity score thresholds.

Method 700 may be executed by processor 511 in coordination with semantic router 549 by executing instructions stored in memory 512. These instructions, stored in non-transitory computer-readable memory and executed by one or more processors, enable multi-modal semantic routing that reduces AI service costs while maintaining response quality across text, audio, image, and video modalities.

At step 702, processor 511 receives communications destined for AI services, which may include text input 602, audio input 604, image input 606, or video input 608. The multi-modal support enables unified semantic routing across different AI application types, eliminating the need for separate optimization infrastructure for each modality. This architectural advantage provides consistent cost reduction benefits whether the AI service handles customer service voice interactions, chatbot text conversations, image recognition requests, or video content analysis.

At step 704, processor 511 may invoke semantic encoder 550 to encode the received input communication into a dense embedding vector using modality-specific encoders. A "multi-dimensional semantic embedding space" (also referred to as "semantic vector space" or "embedding space") is a single continuous vector space of dimensionality D (typically 384-768) where: Each point represents a possible semantic meaning. Distance between points indicates semantic similarity. All modalities (text, audio, image, video) are projected into this shared space via modality-specific encoders.

Text encoder 706 processes text inputs using transformer-based language models that capture semantic meaning beyond surface lexical forms. Speech to vector encoder 708 converts audio inputs directly into semantic vectors without intermediate speech-to-text transcription, eliminating transcription latency (100-500 ms) and preventing transcription errors from propagating downstream. Image encoder 710 processes visual inputs extracting semantic features representing visual content meaning. Video encoder 712 handles temporal visual content capturing both spatial and temporal semantic information. All encoders project inputs into a shared semantic embedding space maintained in semantic representation repository 552, enabling cross-modal similarity computation and routing decisions. This unified embedding space provides the technical foundation for generalized semantic routing that operates consistently across modalities.

In a preferred embodiment, video encoder 712 implements a video transformer architecture that captures both spatial visual features and temporal dynamics across video frames. The encoder processes video inputs through the following stages: (a) frame sampling, selecting N frames (typically N=8 to 32) uniformly distributed across the video duration; (b) spatial encoding of each frame using a vision transformer backbone shared with or identical to image encoder 710; (c) temporal encoding using temporal transformer layers that model relationships across frames; and (d) temporal pooling and projection to the shared semantic embedding space.

At step 714, embedding similarity analyzer 554, invoked by processor 511, computes a similarity score between the dense embedding vector and stored semantic representations in semantic representation repository 552. Similarity score refers to a numerical value typically ranging from 0.0 to 1.0 (or −1.0 to 1.0 for some metrics) that quantifies the semantic closeness between two embedding vectors. The similarity computation employs cosine similarity, Euclidean distance, or dot product measures in the high-dimensional embedding space.

Cosine similarity is computed as:

$\cos(\theta)=(A\cdot B)/(\|A\|\|B\|)$, where $A$ represents the input embedding and $B$ represents each cached semantic object embedding.

Euclidean distance:

$d=\|A-B\|$, measuring straight-line distance in vector space, with smaller values indicating greater similarity;

This similarity score quantifies semantic equivalence independent of surface variation. For example, “What time do you close?” and “When do you shut down?” generate high similarity scores despite different lexical forms because they map to nearby regions in semantic space representing the same underlying intent. Throughout this specification, similarity scores are presented using cosine similarity unless otherwise specified, with higher scores indicating greater semantic similarity.

At step 716, processor 511 uses a confidence threshold controller 556 to evaluate whether the similarity score exceeds first confidence threshold $T_1$.

“First confidence threshold” may also be referred to as “high-confidence threshold” (denoted $T_1$) refers to the similarity score threshold above which cached responses are retrieved directly without AI model invocation. Typical values range from 0.90 to 0.98, with exemplary implementations using $T_1 \approx 0.95$. Similarity scores exceeding this threshold indicate high confidence that the cached response adequately addresses the incoming communication’s semantic intent.

When the similarity score exceeds $T_1$ (typically 0.95-0.98 representing high confidence semantic match), method 700 proceeds to step 718 where the response is retrieved directly from the response repository 552 (Tier 1 processing). This direct cache retrieval provides multiple technical advantages. The network round-trip latency to external AI services is eliminated, response time may be reduced from 500-2000 ms to under 50 ms for real-time conversational interactions. Further, tokenization overhead is where thousands of tokens per interaction would otherwise require GPU computational cycles is avoided. This type of direct retrieval provides zero-cost inference as cached responses require only memory access operations rather than expensive neural network forward passes. This type of processing maintains deterministic response consistency where the same semantic input always produces identical output, important for compliance and auditing requirements in regulated industries.

When the similarity score does not exceed $T_1$, at step 720, processor 511 evaluates whether the similarity score falls below second threshold $T_2$. “Second confidence threshold” may also be referred to as “low-confidence threshold” (denoted $T_2$) refers to the similarity score threshold below which full generative AI processing is invoked. Typical values range from 0.60 to 0.85, with exemplary implementations using $T_2 \approx 0.70$-0.75. Similarity scores below this threshold indicate that cached content is insufficient and novel generative processing is required.

When below $T_2$ (typically 0.75-0.85 representing low confidence that cached content applies), method 700 proceeds to step 722 for full generative processing (Tier 3). This full processing path invokes the complete tokenization and neural network inference pipeline, incurring standard AI service costs but ensuring response quality for novel inputs outside cached semantic space.

When the similarity score falls between the first confidence threshold $T_1$ and second confidence threshold $T_2$, then at step 724, processor 511 uses hybrid processing. Intermediate confidence region refers to the similarity score range between the first confidence threshold $T_1$ and second confidence threshold $T_2$ (i.e., $T_2 \leq$ similarity $< T_1$) where hybrid template-based processing is applied. This region enables partial cache utilization by combining static cached segments with dynamically generated content. At step 726, processor 511 may generate a composite response using static content segments from the repository and AI service generated dynamic segments (Tier 2 processing).

Template responses are structured as ordered sequences of typed segments:

Template=[Segment$_1$, Segment$_2$, . . . , Segment$_n$] where each Segment is either:

(a) StaticSegment {text: string, audio: waveform} (b) DynamicSlot {type: enum, constraints: schema}

Dynamic slot types include:

NAME: proper noun requiring TTS synthesis

DATE: temporal value with format specification

TIME: clock time with timezone handling

NUMBER: numeric value with unit/precision

ACCOUNT_ID: alphanumeric identifier

Example template structure:

[“Your appointment is scheduled for”,

SLOT {type: DATE, format: “MMMM D”},

“at”,

SLOT {type: TIME, format: "h: mm A"},
"with",
SLOT {type: NAME, voice_params: {gender, pitch}}]

For example, a cached template "Your appointment is scheduled for [TIME] with [PROVIDER]" retrieves static segments "Your appointment is scheduled for" and "with" from cache (zero cost) while invoking constrained generation for variable slots [TIME] and [PROVIDER] (minimal cost as only short dynamic segments require AI service processing). This hybrid approach achieves intermediate cost/quality tradeoff: approximately 70-80% cost reduction compared to full generative processing while maintaining response quality through validated template structures. The partial cache reuse provides substantial optimization for semi-structured domains where response templates are stable but specific details vary across interactions.

In an embodiment, initial threshold values may be determined by historical analysis (computing similarity distributions from pilot) deployments and selecting threshold values that partition the distribution into desired cache-hit, hybrid, and full-generation zones. In an embodiment, initial threshold may be based on quality-calibrated initialization by setting $T_1$ such that cached responses maintain >95% quality score and setting $T_2$ such that hybrid responses maintain >85% quality score. In an embodiment, initial threshold values may be domain-specific defaults: Using empirically validated starting values ($T_1$=0.95, $T_2$=0.75 for transactional voice; $T_1$=0.90, $T_2$=0.65 for open-ended conversation) subject to subsequent learning-based adjustment Consider an example of a customer service AI handling appointment inquiries. Customer 1 asks "What time is my appointment?" Semantic encoder 550 generates embedding, embedding similarity analyzer 554 computes similarity score 0.89 against cached template (between $T_1$=0.95 and $T_2$=0.80), confidence threshold controller 556 routes to Tier 2 hybrid processing, processor 511 retrieves template "Your appointment is scheduled for [TIME]" from cache, invokes external AI service 588 for constrained generation of [TIME] slot producing "3 μm tomorrow", assembles final response "Your appointment is scheduled for 3 μm tomorrow". Total cost approximately $0.03 compared to $0.30 for full generative processing, representing 90% cost reduction while maintaining response accuracy through validated template structure.

Figure 8:
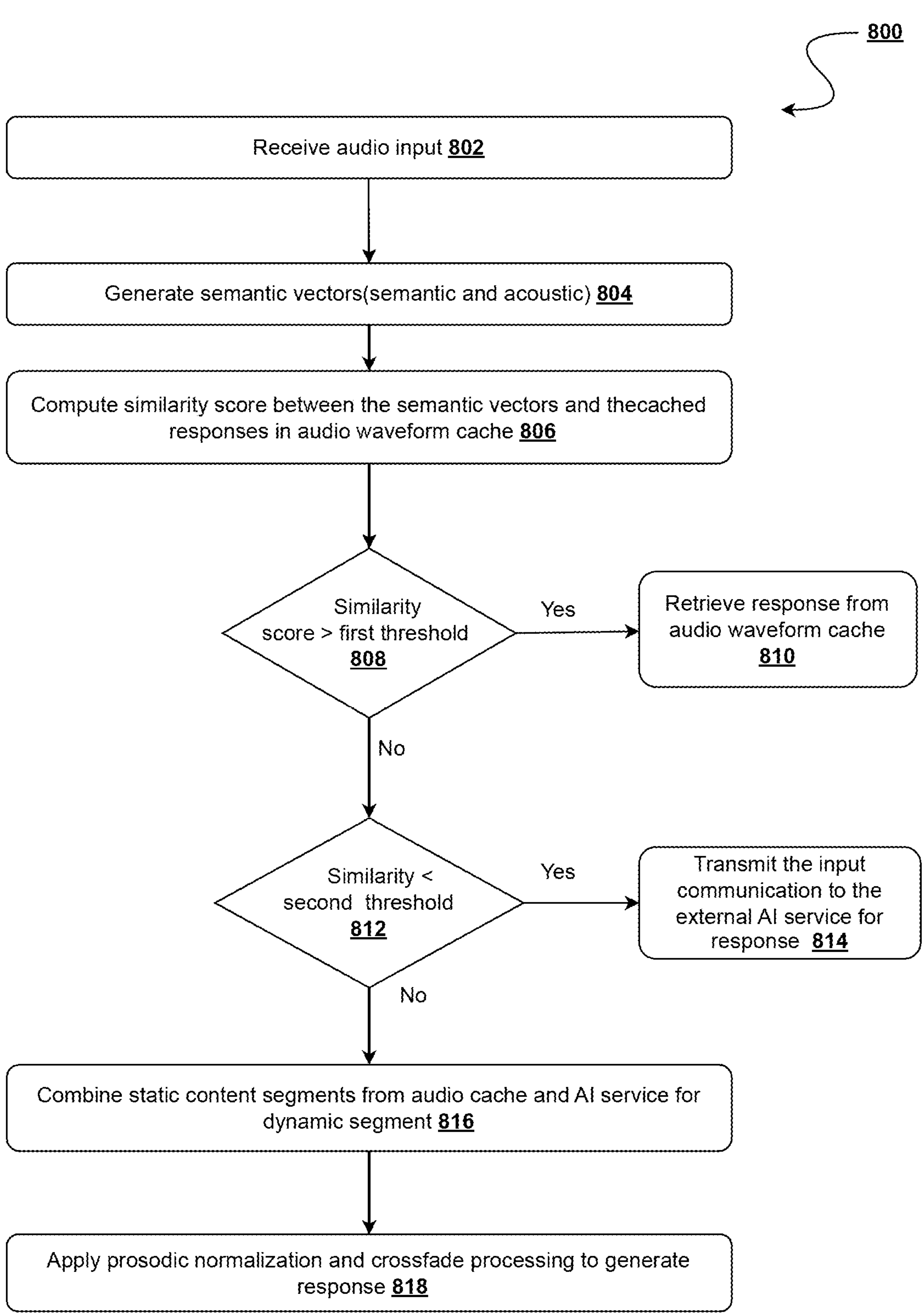
FIG. 8 illustrates a flow diagram of an example method for audio-specific semantic routing with audio waveform caching, according to an embodiment of the invention.

FIG. 8 illustrates a flow diagram of an example method 800 for audio-specific semantic routing with audio waveform caching. Method 800 may be executed by processor 511 in coordination with voice query processor 569 by executing instructions stored in memory 512. These instructions, stored in non-transitory computer-readable memory and executed by one or more processors, enable voice-specific optimizations including direct audio waveform caching and prosodic normalization for natural speech assembly.

At step 802, processor 511 using semantic router 549 receives audio input from a communication channel. The audio input may originate from PSTN telephony connections, SIP-based VoIP systems, mobile voice applications, or web-based voice interactions. This voice-specific method addresses unique challenges in voice AI optimization including, but not limited to, expensive text-to-speech synthesis operations that consume substantial computational resources for every response, prosodic discontinuities when concatenating separately synthesized audio segments create unnatural "robotic" quality, and telephony codec requirements spanning G.711 for PSTN, Opus for VOIP, and WebRTC formats for browsers.

At step 804, processor 511 using audio to intent encoder 574 generates semantic vectors comprising both semantic and acoustic components. The semantic vectors capture the meaning of spoken content while acoustic vectors encode prosodic features including pitch contour, rhythm patterns, and energy characteristics. This dual-vector representation enables both semantic matching for intent recognition and acoustic matching for natural speech assembly.

The direct audio-to-intent encoding eliminates intermediate speech-to-text transcription, providing multiple technical advantages. Latency is reduced by 100-500 ms by bypassing transcription pipeline. Transcription errors (5-15% word error rate in noisy conditions) may be prevented from propagating to downstream intent classification. Acoustic features may be preserved and used for speaker identification and emotion detection that are lost in text-only representations.

At step 806, processor 511 may invoke embedding similarity analyzer 554 to compute similarity scores between the semantic vectors and cached responses stored in audio waveform cache 570. Audio cache 570 stores pre-computed audio waveforms rather than text responses, enabling direct audio retrieval without text-to-speech synthesis. The cache implements codec-aware storage maintaining multiple format versions of each cached response: G.711 mu-law and A-law for PSTN compatibility, Opus for modern VoIP applications, and WebRTC formats for browser-based communications. This multi-codec storage eliminates runtime transcoding latency and ensures optimal audio quality for each delivery channel.

At step 808, when confidence threshold controller 556, controlled by processor 511 determines that the similarity score exceeds first confidence threshold $T_1$, method 800 proceeds to step 810 where processor 511 retrieves the cached audio waveform directly from audio waveform cache 570 without AI service invocation. This direct audio retrieval provides maximum cost optimization by eliminating eliminates expensive text-to-speech synthesis operation (typically $0.015 per 1000 characters. Response latency may be reduced from 800-1500 ms (including TTS synthesis time) to under 50 ms for cached audio retrieval. Further, the system ensures consistent voice quality and pronunciation as identical cached audio waveform is delivered for semantically equivalent inputs while maintaining maintains natural prosody without concatenation artifacts.

At step 812, when processor 511 using confidence threshold controller 556 determines that the similarity score falls below a second confidence threshold $T_2$, method 800 proceeds to step 814 where processor 511 transmits the audio input to external AI service 588 for full voice AI processing including complete speech recognition, natural language understanding, response generation, and text-to-speech synthesis pipeline. This full processing path incurs standard voice AI service costs but ensures response quality for novel inputs outside cached semantic space.

When similarity score falls between the first confidence threshold and the second confidence threshold, at step 816, processor 511 combines static content segments from audio cache 570 with AI service generated dynamic segments using dynamic slot synthesizer 576. For example, template "Your appointment with [PROVIDER] is scheduled for [TIME]" retrieves cached audio segments "Your appointment with", "is scheduled for" while synthesizing variable content "Dr. Smith", "3 μm tomorrow".

At step 818, processor 511 using prosodic normalizer 572 applies prosodic normalization and crossfade processing to generate natural-sounding audio response. Prosodic normalizer 572 adjusts pitch contours, rhythm patterns, and energy envelopes to match target characteristics, then applies raised cosine windowing at segment boundaries:

$$w(n)=0.5\times(1-\cos(2\pi n/(N-1)))$$ where $N$ is window length in samples.

This crossfades process eliminates audible discontinuities at segment boundaries that would otherwise create "robotic" quality, ensuring hybrid responses maintain natural conversational flow indistinguishable from fully synthesized speech.

The voice-specific architecture provides significant technical advantages over text-based semantic routing. By caching actual audio waveforms rather than text responses, the system eliminates computationally expensive text-to-speech synthesis operations representing 40-60% of voice AI processing costs. Serving responses from local audio cache 570 rather than external AI services eliminate round-trip network latency, reducing end-to-end response time from 800-2000 ms (typical for external voice AI services including TTS synthesis) to under 50 ms for cached responses, enabling more natural conversational interactions that maintain sub-200 ms latency requirements. The architecture also reduces dependency on external AI service availability. When external services experience outages or degraded performance, semantic router 549 continues serving cached responses for majority of requests, improving overall system reliability and uptime.

Figure 9:
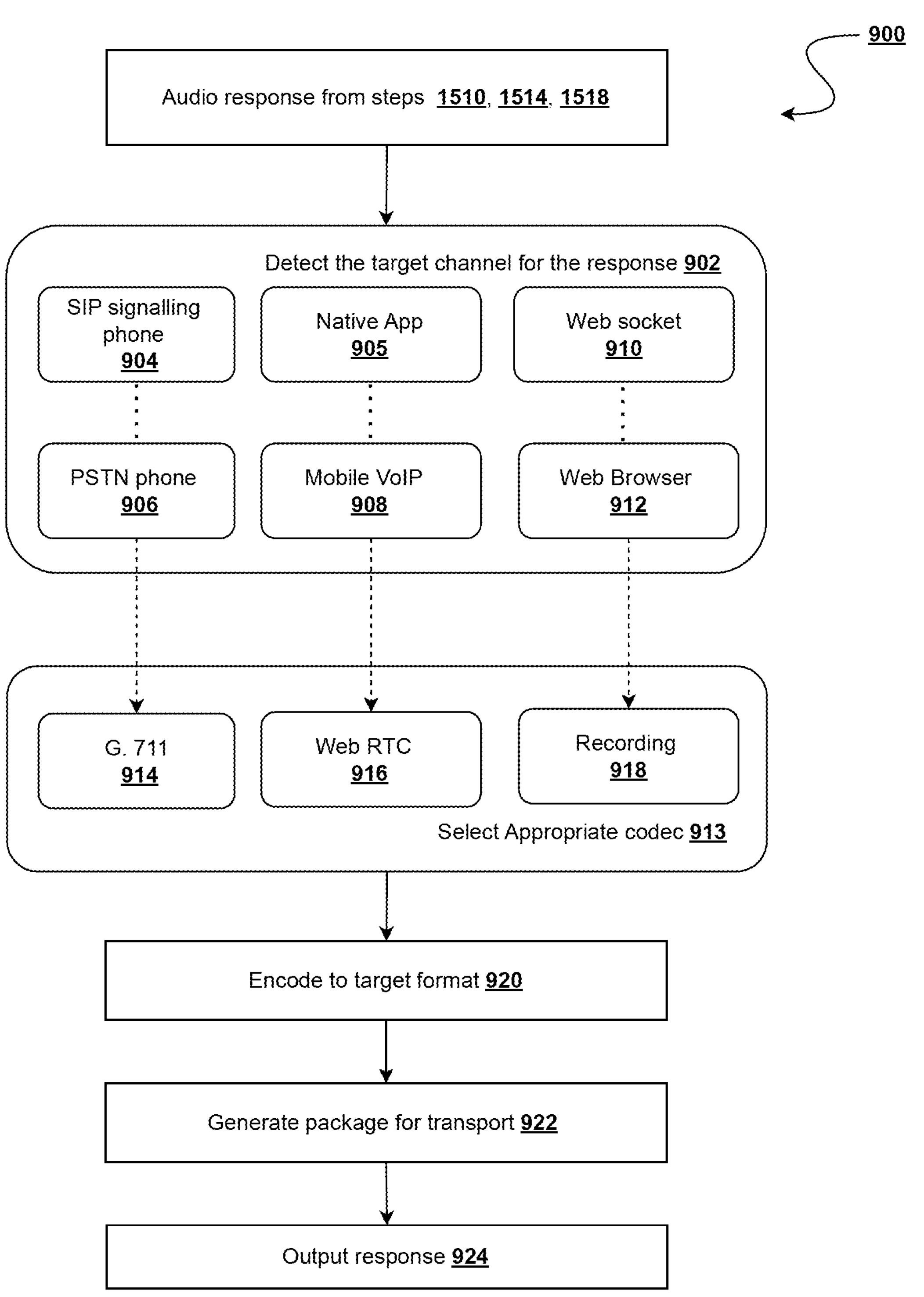
FIG. 9 illustrates a flow diagram of an example method for telephony-to-voice-AI, according to an embodiment of the invention.

FIG. 9 illustrates a flow diagram of an example method 900 for telephony-to-voice-AI bridging, according to an embodiment of the invention that enable semantic routing optimizations to benefit callers across diverse communication infrastructure. Method 900 receives audio responses from steps 810, 814, or 818 of FIG. 8, representing cached responses, full AI-generated responses, or hybrid assembled responses respectively.

At step 902, processor 511 may detect the target channel for the response. Supported channels include SIP signaling phone 904 for enterprise VoIP systems, PSTN phone 906 for traditional telephone networks, mobile VoIP 908 for smartphone applications, web socket 910 for real-time web applications, and web browser 912 for browser-based voice interactions. Native app 905 represents mobile application delivery.

At step 913, codec transformer 580 may select the appropriate audio codec based on the detected target channel. Available codecs include G.711 914 for PSTN and traditional telephony with both mu-law and A-law variants, WebRTC 916 for browser-based real-time communication, and recording format 918 for archival purposes. Codec selection balances audio quality requirements against bandwidth constraints and compatibility requirements of the target channel.

At step 920, processor 511 may encode the audio response to the target format using the selected codec. This transcoding process converts the internal audio representation to the specific format required by the delivery channel.

At step 922, processor 511 may generate an appropriate transport package for the encoded audio. This may include RTP packets for real-time transport, HTTP streaming segments for web delivery, or any other transport-specific encapsulation as required by the target channel.

At step 924, processor 511 may output the response through multimedia gateway 508 to the appropriate delivery channel, completing the voice AI interaction with sub-200 ms latency to ensure natural conversational flow.

Customer calls business hours hotline from landline PSTN phone. Multimedia gateway 508 detects incoming call via PSTN trunk (step 902), voice query processor 569 routes to Tier 1 cached response, codec transformer 580 selects G.711 mu-law codec (step 913), retrieves pre-encoded G.711 version from audio cache 570 (step 920), packages into RTP/SIP transport (step 922), delivers response through PSTN trunk (step 924) in 42 ms total latency. Subsequent caller accesses same service via WebRTC browser interface. Multimedia gateway 508 detects WebRTC connection, codec transformer 580 selects Opus codec, retrieves pre-encoded Opus version from cache, packages with SRTP encryption, delivers via WebSocket in 38 ms. Both callers receive semantically identical response optimized for their respective infrastructure with consistent sub-50 ms latency and zero AI service cost.

Customer calls business hours hotline from landline PSTN phone. Multimedia gateway 508 detects incoming call via PSTN trunk (step 902), voice query processor 569 routes to Tier 1 cached response, codec transformer 580 selects G.711 mu-law codec (step 913), retrieves pre-encoded G.711 version from audio cache 570 (step 920), packages into RTP/SIP transport (step 922), delivers response through PSTN trunk (step 924) in 42 ms total latency. Subsequent caller accesses same service via WebRTC browser interface. Multimedia gateway 508 detects WebRTC connection, codec transformer 580 selects Opus codec, retrieves pre-encoded Opus version from cache, packages with SRTP encryption, delivers via WebSocket in 38 ms. Both callers receive semantically identical response optimized for their respective infrastructure with consistent sub-50 ms latency and zero AI service cost.

Figure 10:
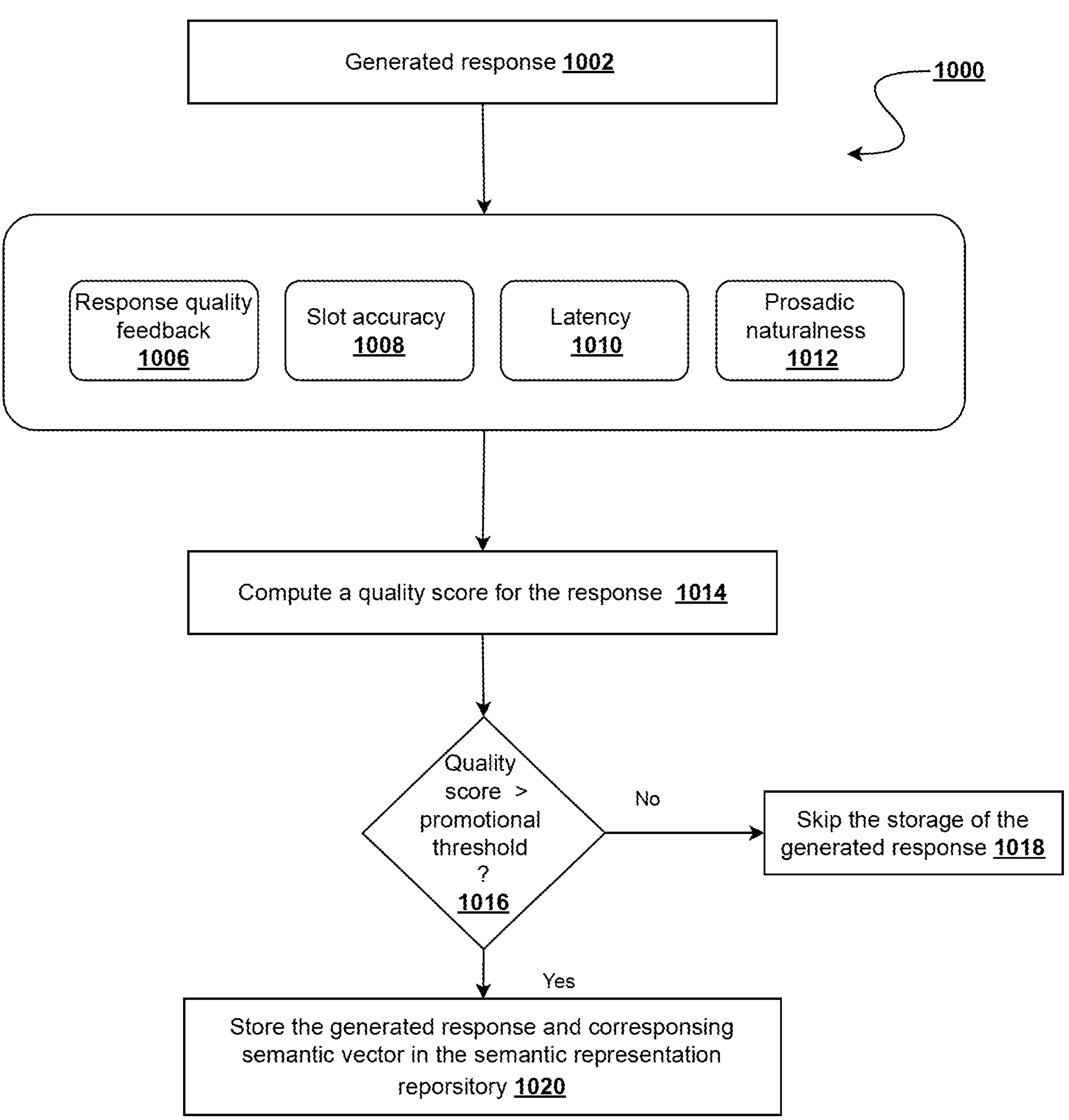
FIG. 10 illustrates a flow diagram of an example method for response quality assessment and storage decision-making for generated responses, according to an embodiment of the invention.

FIG. 10 illustrates a flow diagram of an example method 1000 for response quality assessment and storage decision-making that determines which generated responses merit caching in semantic representation repository, according to an embodiment of the invention. This method implements the cache population logic that builds and maintains the semantic representation repository 552 over time through selective storage of high-quality responses.

Method 1000 may be executed by processor 511 in coordination with response quality evaluator 562 by executing instructions stored in memory 512. These instructions, stored in non-transitory computer-readable memory and executed by one or more processors, enable intelligent cache population that maintains high-quality semantic representation repository 552 through selective storage decisions.

Method 1000 begins with generated response 1002 from any of the routing paths in FIG. 7 or FIG. 8. Processor 511 using response quality evaluator 562 collects multiple quality metrics for evaluation.

In an embodiment, response quality feedback 1006 may capture explicit user satisfaction signals (direct ratings when available) and implicit signals including conversation continuation indicating user acceptance, task completion indicating response adequacy, and abandonment patterns indicating response failure.

In an embodiment, slot accuracy 1008 may measure correctness of dynamic element insertion in hybrid responses (Tier 2), ensuring that names, dates, times, and other variable content are correctly synthesized and appropriately inserted into template structures.

For each dynamic slot in a hybrid response template, the system computes slot-specific accuracy based on slot type.

In case of name slot, phonetic matching is done using soundex or metaphone algorithms comparing synthesized name against source data, character-level edit distance is normalized by name length and accuracy=1.0−(edit_distance/max_name_length)

In case of date and time slots, exact match verification is performed against source timestamp data, format compliance checking (e.g., "March 15th" vs "3/15" vs "15 March") is executed and accuracy=1.0 for exact semantic match, 0.5 for format variation with correct value, 0.0 for incorrect value.

In case of number slots, numerical value comparison with tolerance for rounding (e.g., "$1,234.56" vs "$1,234.6") is considered, unit consistency verification (e.g., dollars vs cents, miles vs kilometers) is used and accuracy=1.0 for exact match, proportional penalty for numerical deviation In case of account identity and alphanumeric slots, exact character-by-character verification is performed and accuracy=matching_characters/total_characters The aggregate slot accuracy for a hybrid response is computed as:

$$\text{slot\_accuracy} = \sum(\text{slot\_accuracy\_i} \times \text{slot\_weight\_i}) / \sum(\text{slot\_weight\_i})$$

where slot_weight_i reflects the criticality of each slot type (e.g., ACCOUNT_ID weight=2.0, NAME weight=1.5, DATE weight=1.0).

For audio responses, additional slot accuracy dimensions include pronunciation accuracy. Prosodic integration and intelligibility. Pronunciation accuracy is determined by comparing synthesized audio against reference pronunciations using dynamic time warping on MFCC features. Prosodic integration refers to measuring pitch and energy continuity at slot boundaries. Intelligibility refers to automated speech recognition accuracy on the synthesized slot content.

In an embodiment, latency 1010 may measure response time from input receipt to response delivery, ensuring that caching and hybrid processing maintain acceptable conversational pace (sub-200 ms target for voice applications).

In a preferred embodiment, slot accuracy 1008 for hybrid responses (Tier 2) may be computed through automated verification and optional human validation procedures.

In an embodiment, prosodic naturalness 1012 may evaluate speech quality of audio responses including pitch continuity, rhythm consistency, and absence of audible artifacts at segment boundaries, particularly important for Tier 2 hybrid responses using prosodic normalization.

At step 1014, processor 511 using response quality evaluator 562 computes a quality score for the response based on weighted combination of collected metrics. The weighting may be configured based on domain requirements. For example, customer service applications may prioritize user satisfaction and task completion over latency, while real-time voice applications may weight latency and prosodic naturalness more heavily. An exemplary quality score computation for voice responses uses:

Quality_Score=(User_Satisfaction×0.35)+(Slot_Accuracy×0.25)+(Prosodic_Naturalness×0.25)+(1−Latency_Normalized×0.15), where each component is normalized to range [0.0, 1.0].

At step 1016, processor 511 may evaluate whether the quality score exceeds a promotional threshold (typically 0.75-0.85 depending on domain requirements and cache capacity constraints). This promotional threshold determines which responses merit storage in semantic representation repository 552.

"Promotional threshold" may also be referred to as "cache admission threshold" and refers to the quality score threshold that generated responses must exceed to be stored in the semantic representation repository for future retrieval. Typical values range from 0.70 to 0.90, with exemplary implementations using 0.75-0.85. This threshold implements quality gating to ensure only validated high-quality responses populate the cache.

When the quality score does not exceed the promotional threshold, at step 1018 processor 511 skips storage of the generated response. This selective storage prevents low-quality responses from polluting semantic representation repository 552 and causing future false positive matches that degrade response quality. By maintaining high quality standards for cache admission, the system ensures that cached responses reliably meet quality requirements when retrieved.

The promotional threshold (typically 0.75-0.85) differs from routing thresholds $T_1$ and $T_2$ in that routing thresholds determine retrieval decisions (input similarity) while promotional threshold determines storage decisions (output quality). The promotional threshold may be computed as:

$$\text{Promo\_Threshold} = \text{Target\_Quality} - \text{Quality\_Margin}$$

where Target_Quality represents minimum acceptable quality (e.g., 0.85), and Quality_Margin provides buffer against quality degradation (e.g., 0.05)

When the quality score exceeds the promotional threshold, at step 1020, processor 511 stores the generated response and corresponding semantic vector in semantic representation repository 552. For text modalities, the stored object includes the response text, semantic embedding vector, intent identifier, and quality metadata. For voice modalities, the stored object includes audio waveform in multiple codec formats (stored in audio cache 570), semantic and acoustic embedding vectors, prosodic characteristics, and quality metadata. The storage operation updates both the semantic representation repository 552 (for similarity matching) and the audio cache 570 (for waveform retrieval), creating indexed entries that enable efficient retrieval during future routing decisions.

At step 1020, processor 511 stores the generated response and corresponding semantic vector in semantic representation repository by performing the following operations:

(a) Index the semantic vector for similarity search: The semantic vector is inserted into a vector index structure optimized for approximate nearest neighbor (ANN) search. In exemplary embodiments, the index implements Hierarchical Navigable Small World (HNSW) algorithm or Inverted File Index (IVF) with Product Quantization (PQ). The indexing operation creates data structures enabling sub-10 millisecond similarity search across repositories containing millions of cached semantic objects. The index stores the vector coordinates along with metadata pointers enabling efficient retrieval.

(b) Associate the generated response with the indexed vector: The system creates a bidirectional mapping where the semantic vector points to response content (text response or reference to audio waveform in audio cache 570) and the response content maintains a reference to its semantic vector. For text responses, the response text is stored directly in the repository. For audio responses, the system stores a reference identifier (URI or file path) pointing to pre-encoded audio waveforms in audio cache 570 across multiple codec formats. The association includes the intent identifier for human-readable categorization.

(c) Record quality metadata for future cache promotion decisions: Quality metadata recorded includes: the initial quality score computed during storage decision (e.g., 0.87), timestamp of storage (e.g., ISO 8601 format: 2025-01-15T14: 23:10Z), the promotional threshold value at time of storage (e.g., 0.80), component quality metrics (user feedback score, task completion indicator, latency measurement, prosodic naturalness for audio), token cost incurred during generation, and initialization of usage statistics (retrieval count set to 0, quality variance set to 0.0). This metadata enables reward-based learning optimizer 564 to make informed decisions about priority ranking, cache eviction, and threshold adjustments during subsequent optimization cycles.

The combined indexing, association, and metadata recording operations typically complete within 5-15 milliseconds, adding negligible latency to response generation while enabling immediate availability of the cached response for future semantic matching operations. This cache population method provides critical quality assurance for semantic routing architecture. By selectively storing only high-quality validated responses, method 1000 prevents cache pollution that would otherwise degrade routing accuracy over time. The quality-gated admission ensures that similarity thresholds $T_1$ and $T_2$ maintain reliable predictive power. When similarity exceeds $T_1$, retrieved cached responses consistently meet quality standards because only validated responses were admitted to cache. This quality control enables the progressive cache hit rate improvements described in FIG. 11 while maintaining response quality throughout system maturation.

Reward-based learning optimizer 564 updates semantic representation repository 552 based on quality scores through priority ranking adjustments and cache eviction policies. For cached semantic objects associated with high quality scores (e.g., quality score >0.90), the optimizer increases priority ranking by incrementing a priority score value, moving the cached object toward the front of retention queues, and marking it as preferred for similarity matching when multiple cached objects have similar similarity scores. High-priority objects receive preferential treatment during cache management operations, reducing their likelihood of eviction during capacity constraints.

For cached semantic objects associated with low quality scores (e.g., quality score <0.60), the optimizer decreases priority ranking by decrementing priority score values, or evicts the cached semantic object entirely by removing it from the semantic representation repository including: (i) removing the semantic vector from the vector index, (ii) deleting the associated response content or audio waveform reference, (iii) purging quality metadata and usage statistics, and (iv) reclaiming storage resources for subsequent cache population.

Priority ranking adjustments follow a decay function where $$\text{priority\_new} = \text{priority\_old} \times \text{decay\_rate} + \text{quality\_boost, with}$$

$$\text{decay\_rate}(e.g., 0.95)$$

gradually reducing priority over time and quality_boost (e.g., quality_score× weight) providing positive reinforcement for high-quality responses. This approach ensures that consistently high-quality cached responses remain available while outdated or low-quality responses are progressively evicted, maintaining overall cache quality and preventing cache pollution from degrading routing accuracy.

Consider a voice AI generated response "We're open Monday through Friday, 9 am to 5 μm" for input "What are your hours?". Response quality evaluator 562 collects metrics: user continued conversation (positive signal), response delivered in 350 ms (acceptable latency), prosodic naturalness score 0.92 (high quality TTS output), computes composite quality score 0.88. Quality score exceeds promotional threshold 0.80, processor 511 stores response in semantic representation repository 552 and audio waveforms in audio cache 570 (G.711, Opus, WebRTC formats). Subsequent input "When are you open?" generates similarity score 0.97 to cached "business hours" intent, routes to Tier 1, retrieves cached waveform, delivers in 42 ms with zero AI service cost. The cached response maintains quality because admission threshold ensured only validated high-quality responses were stored.

Figure 11:
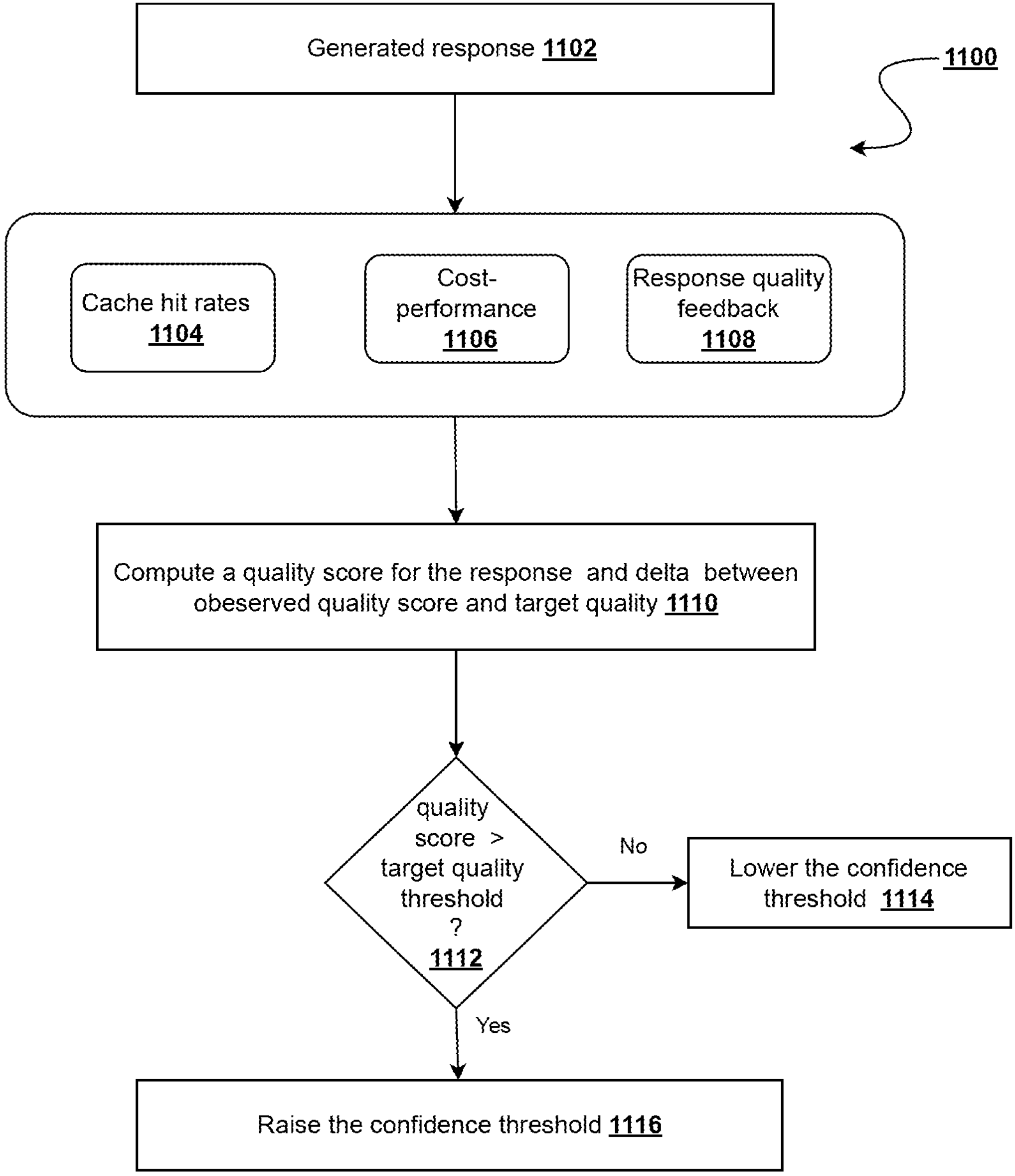
FIG. 11 illustrates a flow diagram of an example method for continuous threshold optimization, according to an embodiment of the invention

FIG. 11 illustrates a flow diagram of an example method 1100 for continuous threshold optimization that enables processor 511 to achieve progressively higher cache hit rates while maintaining response quality through adaptive threshold adjustment, according to an embodiment of the invention. Method 1100 is implemented using reward-based learning optimizer 564 that distinguishes this invention from static threshold systems.

Method 1100 may be executed by processor 511 in coordination with reward-based learning optimizer 564 by executing instructions stored in memory 512. These instructions, stored in non-transitory computer-readable memory and executed by one or more processors, enable continuous performance monitoring and intelligent threshold adjustment that balances cost optimization against response quality maintenance.

Method 1100 begins with generated response 1102 from any of the three routing tiers. Processor 511 using response quality evaluator 562 collects performance metrics that inform threshold optimization. Cache hit rates 1104 measure the percentage of requests successfully served from cache without AI service invocation, providing primary indicator of cost optimization effectiveness. Higher cache hit rates indicate more effective semantic matching and successful cost reduction.

Cost-performance 1106 metrics quantify the actual cost savings achieved through semantic routing, computed as:

Cost_Savings=(Baseline_Cost×Total_Requests)−(Tier1_Requests×Tier1_Cost+Tier2_Requests×Tier2_Cost+Tier3_Requests×Tier3_Cost), where baseline cost represents full generative processing for all requests.

Response quality feedback 1108 includes user satisfaction signals, task completion rates, and quality scores computed by response quality evaluator 562 ensuring that cost optimization does not compromise response quality.

At step 1110, processor 511 using reward-based learning optimizer 564 computes both a quality score for the response and a delta between observed quality score and target quality threshold. Target quality threshold refers to the desired quality score that the system aims to maintain for all generated responses. This threshold informs the threshold adjustment algorithm in reward-based learning optimization. The delta quantifies the magnitude of quality deviation requiring threshold correction:

$$Quality\_Delta = Quality\_Observed - Quality\_Target.$$

where Quality_Observed represents the quality score computed at step 1110 (ranging from 0.0 to 1.0) and Quality_Target represents the configured target quality threshold for the deployment domain (e.g., 0.85 for customer service applications prioritizing user satisfaction, or 0.75 for internal tools prioritizing cost reduction).

A positive delta indicates quality exceeding target (opportunity for more aggressive caching to increase cost savings), while negative delta indicates quality falling below target (need for more conservative caching to improve response accuracy). The target quality threshold is configured based on domain requirements. Typical values range from 0.80 to 0.95, with exemplary implementations using 0.85 for customer service applications and 0.75 for internal tools prioritizing cost reduction.

A negative quality delta (Quality_Delta<0) indicates quality falling below the target, signaling need for more conservative caching to improve response accuracy. For example, if Quality_Observed=0.78 and Quality_Target=0.85, then Quality_Delta=−0.07, indicating a quality deficit requiring threshold raising to reduce false positives where cached responses inadequately match input semantics.

At step 1112, processor 511 may invoke confidence threshold controller 556 to evaluate whether the quality score exceeds target quality threshold. When quality score exceeds target quality, then at step 1114, processor 511 using reward-based learning optimizer 564 lowers the confidence threshold. Lowering threshold $T_1$ permits more inputs to qualify for Tier 1 direct cache retrieval (increasing cache hit rate and cost savings), while lowering threshold $T_2$ permits more inputs to qualify for Tier 2 hybrid processing rather than Tier 3 full generative processing (achieving intermediate cost savings). The threshold adjustment is computed using:

$$T\_new = T\_old - (Quality\_Delta \times \alpha),$$

where $\alpha$ is learning rate (typically 0.01-0.05) preventing oscillation. This downward threshold adjustment exploits quality headroom to capture additional cost optimization opportunities. When responses consistently exceed quality targets, the system can safely route more inputs to lower-cost tiers.

When quality score does not exceed target quality threshold, at step 1116 processor 511 using reward-based learning optimizer 564 raises the confidence threshold. Raising thresholds increases routing selectivity, reducing false positives where cached responses inadequately match input semantics. Threshold raising improves response accuracy by requiring higher similarity confidence before cache retrieval, at cost of reduced cache hit rates. The adjustment formula $$T\_new = T\_old + (|Quality\_Delta| \times \alpha)$$

ensures proportional correction magnitude. This upward threshold adjustment prioritizes quality maintenance over cost optimization when responses fall below quality targets. The system sacrifices some cost savings to ensure user satisfaction and task completion requirements are met.

Reward-based learning optimizer 564 implements a multi-armed bandit approach with epsilon-greedy exploration:

Initialization:

$T_1 \leftarrow 0.95$//High-confidence threshold $T_2 \leftarrow 0.75$//Low-confidence threshold $\alpha \leftarrow 0.02$//Learning rate $\varepsilon \leftarrow 0.10$//Exploration rate For each response R, based on observed_quality, a quality_score(R) is comuted. A quality delta is the difference between observed_quality and target_quality.

With probability $(1-\varepsilon)$://Exploitation if quality_delta>0:

$T_1 \leftarrow T_1 - (quality\_delta \times \alpha)$//Lower threshold to increase cache hits $T_2 \leftarrow T_2 - (quality\_delta \times \alpha)$ else:

$T_1 \leftarrow T_1 + (|quality\_delta| \times \alpha)$//Raise threshold to improve quality $T_2 \leftarrow T_2 + (|quality\_delta| \times \alpha)$ With probability $\varepsilon$://Exploration $T_1 \leftarrow T_1 + uniform\ (-0.05, 0.05)$ $T_2 \leftarrow T_2 + uniform\ (-0.05, 0.05)$ //Enforce Bounds $T_1 \leftarrow clip(T_1, 0.90, 0.98)$ $T_2 \leftarrow clip(T_2, 0.60, 0.85)$ $T_1 \leftarrow max\ (T_1, T_2+0.10)$//Maintain separation This enables continuous adaptation while preventing threshold collapse or excessive separation.

The continuous optimization loop implemented by method 1100 enables processor 511 to learn domain-specific patterns that maximize cache utilization while maintaining response quality. The reinforcement learning approach implements exploration-exploitation tradeoff: threshold lowering explores opportunities for cost reduction, while threshold raising exploits known-good quality regions.

Cache hit rate trajectory refers to the temporal progression of cache hit rates across deployment phases: (a) Cold-start phase (weeks 1-4): 40-60% cache hit rate as initial semantic objects populate repository; (b) Growth phase (months 2-6): 60-80% cache hit rate as reward-based learning identifies high-frequency patterns and optimizes thresholds; (c) Mature phase (months 6+): 85-95% cache hit rate representing optimal cost reduction within quality constraints; and (d) Maintenance phase: sustained high cache hit rate with periodic reoptimization responding to distribution shifts. The trajectory reflects the learning curve inherent in semantic routing optimization and establishes expected performance benchmarks for deployment evaluation.

Consider an example when during growth phase, voice AI system serves 1000 daily interactions. Reward-based learning optimizer 564 observes cache hit rate 68%, average quality score 0.89 (exceeding target 0.85 by delta+0.04), cost savings $240 daily compared to baseline. Quality exceeds target, optimizer lowers $T_1$ from 0.95 to 0.94 ($\alpha$=0.02, adjustment 0.04×0.02-0.0008 rounded to 0.01 for stability). Following week, cache hit rate increases to 72% as more inputs qualify for Tier 1, quality maintains 0.87 (still exceeding target), cost savings increase to $252 daily. Optimizer continues gradual threshold lowering until quality approaches target 0.85, achieving equilibrium at cache hit rate 78% with quality 0.86, representing optimal balance between cost optimization and quality maintenance for this deployment domain. System maintains these optimized thresholds, adjusting dynamically if input distribution shifts or quality metrics change.

The skilled person will be aware of a range of possible modifications of the various embodiments described above. Accordingly, the present invention is defined by the claims and their equivalents.

What is claimed is:

1. A system for adaptive semantic routing of communication for generative artificial intelligence (AI) systems, the system comprising:

one or more processors, a memory, and a plurality of programming instructions stored in the memory, the plurality of programming instructions when executed by the one or more processors causes the one or more processors to:

receive, at a semantic router, an incoming communication requiring AI processing, wherein the incoming communication comprises at least one of text data, audio data, image data, or video data;

encode the incoming communication into a dense embedding vector within a multi-dimensional semantic embedding space using a neural network encoder, wherein the dense embedding vector captures semantic meaning of the incoming communication;

determine a similarity score between the dense embedding vector and a plurality of cached semantic data records stored in a semantic representation repository, wherein each of the cached semantic data records comprises an intent identifier, a semantic vector, an associated response, and a quality metric computed from historical evaluation data associated with prior responses;

responsive to the similarity score exceeding a first confidence threshold, retrieve a cached response from the semantic representation repository;

responsive to the similarity score falling below a second confidence threshold, transmit the incoming communication to the external generative artificial intelligence service for generating a response; and responsive to the similarity score falling between the first confidence threshold and the second confidence threshold, generate a composite response by combining one or more cached response segments retrieved from the semantic representation repository with dynamically generated response content produced by the external generative artificial intelligence service;

wherein the first confidence threshold and the second confidence threshold are dynamically adjusted based on response quality feedback and are configured to control selection between cached response retrieval, hybrid response generation, and external generative artificial intelligence processing.

2. The system of claim 1, wherein to transmit the input communication to the external generative artificial intelligence service, the plurality of programming instructions, when executed by the one or more processors, causes the one or more processors to:

receive a generated response from the external generative artificial intelligence service;

compute a token cost associated with the generated response;

evaluate, a quality score for the generated response, wherein the quality score is computed based on user feedback, conversation continuation metrics, task completion indicators, or semantic coherence measures; and responsive to the quality score exceeding a promotional threshold, store the generated response and corresponding semantic vector in the semantic representation repository for subsequent semantic matching.

3. The system of claim 2, wherein to store the generated response, the plurality of programming instructions, when executed by the one or more processors, causes the one or more processors to:

index the semantic vector for similarity search;

associate the generated response with the indexed vector; and record quality metadata for future cache promotion decisions.

4. The system of claim 2, wherein the plurality of programming instructions, when executed by the one or more processors, causes the one or more processors to:

update, by a reward-based learning optimizer, the semantic representation repository based on the quality score, wherein update comprises increasing a priority ranking of cached semantic objects associated with high quality scores, decreasing a priority ranking or evicting cached semantic objects associated with low quality scores.

5. The system of claim 1, wherein to generate a composite response, the plurality of programming instructions, when executed by the one or more processors, causes the one or more processors to:

retrieve a template response from the semantic representation repository, wherein the template response comprises static segments and dynamic slot identifiers;

generate dynamic content for each dynamic slot identifier using a constrained generation process; and assemble the composite response by combining the static segments with the generated dynamic content.

6. The system of claim 1, wherein to determine the similarity score between the dense embedding vector and a plurality of cached semantic objects, the plurality of programming instructions, when executed by the one or more processors, causes the one or more processors to:

compute cosine similarity between vector representations;

compute Euclidean distances in the semantic embedding space; or compute dot product similarity measures.

7. The system of claim 1, wherein to dynamically adjust the first confidence threshold and the second confidence threshold, the plurality of programming instructions, when executed by the one or more processors, causes the one or more processors to:

monitor cache hit rates and response quality feedback for every response generated;

adjust at least one of the first confidence threshold or the second confidence threshold based on observed cache hit rates, response quality metrics, and cost-performance tradeoffs.

8. The system of claim 7, wherein to adjust the first confidence threshold and the second confidence thresholds, the plurality of programming instructions, when executed by the one or more processors, causes the one or more processors to:

compute a quality delta between observed quality scores and target quality thresholds;

responsive to the quality scores exceeding a target quality threshold, lower at least one confidence threshold using the quality delta, wherein lowering the confidence threshold increases cache hit rates; and responsive to the quality scores falling below the target quality threshold, raise at least one confidence threshold using the quality delta, wherein raising the confidence threshold improves response accuracy.

9. The system of claim 1, wherein the plurality of programming instructions, when executed by the one or more processors, causes the one or more processors to:

process, using a text encoder, text inputs using transformer-based language models generating 768-dimensional embeddings;

convert, using a speech-to-vector encoder, audio inputs directly into semantic vectors without intermediate speech-to-text transcription;

process, using an image encoder visual input; and handle, using video encoder, temporal visual content, wherein all encoders project their respective inputs into a shared semantic embedding space maintained in the semantic representation repository.

10. A method for adaptive semantic routing of communication for generative artificial intelligence (AI) systems, the method comprising:

receiving at a semantic router, an incoming communication requiring AI processing, wherein the incoming communication comprises at least one of text data, audio data, image data, or video data;

encoding the incoming communication into a dense embedding vector within a multi-dimensional semantic embedding space using a neural network encoder, wherein the dense embedding vector captures semantic meaning of the incoming communication;

determining a similarity score between the dense embedding vector and a plurality of cached semantic objects stored in a semantic representation repository, wherein each of the cached semantic data records comprises an intent identifier, a semantic vector, an associated response, and a quality metric computed from historical evaluation data associated with prior responses;

responsive to the similarity score exceeding a first confidence threshold, retrieving a cached response from the semantic representation repository;

responsive to the similarity score falling below a second confidence threshold, transmitting the incoming communication to the external generative artificial intelligence service for generating a response; and responsive to the similarity score falling between the first confidence threshold and the second confidence threshold, generating a composite response by combining one or more cached response segments retrieved from the semantic representation repository with dynamically generated response content from an external generative artificial intelligence service;

wherein the first confidence threshold and the second confidence threshold are dynamically adjusted based on response quality feedback and control selection between cached response retrieval, hybrid response generation, and external generative artificial intelligence processing.

11. The method of claim 10, wherein transmitting the input communication to the external generative artificial intelligence service, further comprises the steps of:

receiving a generated response from the external generative artificial intelligence service;

computing a token cost associated with the generated response;

evaluating a quality score for the generated response, wherein the quality score is computed based on user feedback, conversation continuation metrics, task completion indicators, or semantic coherence measures; and responsive to the quality score exceeding a promotional threshold, storing the generated response and corresponding semantic vector in the semantic representation repository for subsequent semantic matching.

12. The method of claim 10, wherein storing the generated response comprises the steps of:

indexing the semantic vector for similarity search;

associating the generated response with the indexed vector; and recording quality metadata for future cache promotion decisions.

13. The method of claim 10, wherein generating the composite response comprises the steps of:

retrieving a template response from the semantic representation repository, wherein the template response comprises static segments and dynamic slot identifiers;

generating dynamic content for each dynamic slot identifier using a constrained generation process; and assembling the composite response by combining the static segments with the generated dynamic content.

14. The method of claim 10, wherein to dynamically adjust the first confidence threshold and the second confidence threshold, the plurality of programming instructions, when executed by the one or more processors, causes the one or more processors to:

monitoring cache hit rates and response quality feedback for every response generated;

adjusting at least one of the first confidence threshold or the second confidence threshold based on observed cache hit rates, response quality metrics, and cost-performance tradeoffs.

15. The method of claim 10, wherein adjusting the first confidence threshold and the second confidence threshold comprise the steps of:

computing a quality delta between observed quality scores and target quality thresholds;

responsive to the quality scores exceeding a target quality threshold, lowering at least one confidence threshold using the quality delta, wherein lowering the confidence threshold increases cache hit rates; and responsive to the quality scores falling below the target quality threshold, raising at least one confidence threshold using the quality delta, wherein raising the confidence threshold improves response accuracy.

* * * * *